US011595956B2

United States Patent
Cha et al.

(10) Patent No.: US 11,595,956 B2
(45) Date of Patent: Feb. 28, 2023

(54) METHOD FOR TRANSMITTING OR RECEIVING DOWNLINK SIGNAL AND DEVICE THEREFOR

(71) Applicant: LG ELECTRONICS INC., Seoul (KR)

(72) Inventors: Hyunsu Cha, Seoul (KR); Sukhyon Yoon, Seoul (KR); Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 17/056,408

(22) PCT Filed: May 17, 2019

(86) PCT No.: PCT/KR2019/005914
§ 371 (c)(1),
(2) Date: Nov. 17, 2020

(87) PCT Pub. No.: WO2019/221543
PCT Pub. Date: Nov. 21, 2019

(65) Prior Publication Data
US 2021/0266898 A1 Aug. 26, 2021

(30) Foreign Application Priority Data
May 18, 2018 (KR) .................. 10-2018-0056934

(51) Int. Cl.
*H04W 72/12* (2009.01)
*H04W 72/04* (2009.01)
(Continued)

(52) U.S. Cl.
CPC ......... *H04W 72/0453* (2013.01); *H04L 5/001* (2013.01); *H04W 24/10* (2013.01)

(58) Field of Classification Search
CPC ........... H04W 72/0453; H04W 72/046; H04W 72/048; H04W 24/10; H04W 72/1289;
(Continued)

(56) References Cited

U.S. PATENT DOCUMENTS

| 11,283,565 B2 * | 3/2022 | Yamada | ............... H04B 7/0626 |
| 2017/0251460 A1 * | 8/2017 | Agiwal | ............... H04B 7/0617 |

(Continued)

FOREIGN PATENT DOCUMENTS

WO 2018016907 1/2018

OTHER PUBLICATIONS

PCT International Application No. PCT/KR2019/005914, International Search Report dated Sep. 4, 2019, 18 pages.
(Continued)

*Primary Examiner* — Edan Orgad
*Assistant Examiner* — Vanneilian Lalchinthang
(74) *Attorney, Agent, or Firm* — Lee Hong Degerman Kang Waimey

(57) ABSTRACT

A method for receiving a downlink signal by a terminal in a wireless communication system is disclosed. In particular, the method may comprise: receiving a first downlink signal through a first component carrier on the basis of a particular reception beam; and receiving a second downlink signal through a second component carrier on the basis of the particular reception beam, wherein the first downlink signal and the second downlink signal correspond to different types, and the particular reception beam is determined on the basis of the first component carrier or the first downlink signal.

14 Claims, 27 Drawing Sheets

(A) CONTROL-PLANE PROTOCOL STACK (B) USER-PLANE PROTOCOL STACK

(51) Int. Cl.
  *H04L 5/00* (2006.01)
  *H04B 7/06* (2006.01)
  *H04W 72/0453* (2023.01)
  *H04W 24/10* (2009.01)

(58) Field of Classification Search
  CPC ..... H04W 48/12; H04B 7/086; H04B 7/0632; H04B 7/0695; H04B 7/088; H04B 7/0617; H04L 5/001; H04L 27/2602; H04L 5/0048; H04L 5/0051; H04L 5/0073; H04L 1/0026
  USPC .......................................................... 370/329
  See application file for complete search history.

(56) References Cited

U.S. PATENT DOCUMENTS

| | | | | |
|---|---|---|---|---|
| 2018/0332520 A1* | 11/2018 | Cheng | ............... | H04W 36/0088 |
| 2019/0045559 A1* | 2/2019 | Huang | ................ | H04W 72/046 |
| 2019/0069285 A1* | 2/2019 | Chandrasekhar | ... | H04W 72/048 |
| 2019/0159136 A1* | 5/2019 | MolavianJazi | ......... | H04L 5/001 |
| 2019/0261234 A1* | 8/2019 | Park | .................. | H04W 36/0072 |
| 2019/0313428 A1* | 10/2019 | Zhou | ..................... | H04L 5/0091 |
| 2019/0313429 A1* | 10/2019 | Cheng | .................... | H04L 5/0053 |
| 2019/0327123 A1* | 10/2019 | Wang | ..................... | H04W 56/00 |
| 2019/0349061 A1* | 11/2019 | Cirik | ..................... | H04B 7/0617 |
| 2020/0059281 A1* | 2/2020 | Grant | ..................... | H04B 7/024 |
| 2021/0045076 A1* | 2/2021 | Tomeba | .................. | H04L 27/26 |
| 2021/0368468 A1* | 11/2021 | Xing | ..................... | H04W 64/00 |

OTHER PUBLICATIONS

Mediatek Inc., "Views on multi-CC QCL assumptions," 3GPP TSG RAN WG1 Meeting #93, R1-1806790, May 2018, 8 pages.

Ericsson et al., "Measurement capability for SSB based measurements," 3GPP TSG-RAN WG4 Meeting #86bis, R4-1806012, Apr. 2018, 7 pages.

Intel Corporation, "Simultaneous Tx and Rx of physical channels and RS," 3GPP TSG RAN WG1 Meeting #93, R1-1806509, May 2018, 12 pages.

Nokia et al., "On Channels Multiplexing," 3GPP TSG RAN WG1 Meeting #93, R1-1807188, May 2018, 7 pages.

* cited by examiner (A) CONTROL-PLANE PROTOCOL STACK (B) USER-PLANE PROTOCOL STACK (a)

(b)

METHOD FOR TRANSMITTING OR RECEIVING DOWNLINK SIGNAL AND DEVICE THEREFOR

CROSS-REFERENCE TO RELATED APPLICATIONS

This application is the National Stage filing under 35 U.S.C. 371 of International Application No. PCT/KR2019/005914, filed on May 17, 2019, which claims the benefit of earlier filing date and right of priority to Korean Application No. 10-2018-0056934, filed on May 18, 2018, the contents of which are all incorporated by reference herein in their entirety.

TECHNICAL FIELD

The present disclosure relates to a method and apparatus for transmitting and receiving a downlink (DL) signal, and more particularly, to a method and apparatus for transmitting and receiving a DL signal such as a channel state information reference signal (CSI-RS), a synchronization signal/physical broadcast channel (SS/PBCH) block, a physical downlink control channel (PDCCH), a physical downlink shared channel (PDSCH), and a channel state information interference measurement (CSI-IM).

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a downlink (DL) signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present disclosure, a method of receiving a downlink signal by a user equipment (UE) in a wireless communication system includes receiving a first downlink signal in a first component carrier based on a specific reception beam, and receiving a second downlink signal in a second component carrier based on the specific reception beam. The first downlink signal and the second downlink signal are of different types, and the specific reception beam is determined based on the first component carrier or the first downlink signal.

One of a synchronization signal/physical broadcast channel (SS/PBCH) block and a physical downlink shared channel (PDSCH) may be the first downlink signal, and the other may be the second downlink signal.

Further, when the first downlink signal is an SS/PBCH block, reporting of reference signal received power (RSRP) of the SS/PBCH block may be configured.

Further, when the first downlink signal is an SS/PBCH block, no reporting of a measurement related to the SS/PBCH block may be configured.

Further, the first component carrier may be a primary component carrier.

Further, the UE may be communicable with at least one of a UE other than the UE, a network, a base station (BS), or an autonomous driving vehicle.

According to the present disclosure, an apparatus for receiving a downlink signal in a wireless communication system includes at least one processor, and at least one memory operatively coupled to the at least one processor and storing instructions which, when executed by the at least one processor, cause the at least one processor to perform specific operations. The specific operations include receiving a first downlink signal in a first component carrier based on a specific reception beam, and receiving a second downlink signal in a second component carrier based on the specific reception beam. The first downlink signal and the second downlink signal are of different types, and the specific reception beam is determined based on the first component carrier or the first downlink signal.

One of an SS/PBCH block and a PDSCH may be the first downlink signal, and the other may be the second downlink signal.

Further, when the first downlink signal is an SS/PBCH block, reporting of reference signal received power (RSRP) of the SS/PBCH block may be configured.

Further, when the first downlink signal is an SS/PBCH block, no reporting of a measurement related to the SS/PBCH block may be configured.

Further, the first component carrier may be a primary component carrier.

Further, the apparatus may be communicable with at least one of a user equipment (UE), a network, a base station (BS), or an autonomous driving vehicle other than the apparatus.

According to the present disclosure, a UE for receiving a downlink signal in a wireless communication system includes at least one transceiver, at least one processor, and at least one memory operatively coupled to the at least one processor and storing instructions which, when executed by the at least one processor, cause the at least one processor to perform specific operations. The specific operations include receiving a first downlink signal in a first component carrier based on a specific reception beam, and receiving a second downlink signal in a second component carrier based on the specific reception beam. The first downlink signal and the second downlink signal are of different types, and the specific reception beam is determined based on the first component carrier or the first downlink signal.

According to an embodiment of the present disclosure, a method of transmitting a downlink signal by a base station (BS) in a wireless communication system includes transmitting a first downlink signal in a first component carrier, and transmitting a second downlink signal in a second component carrier. The first downlink signal and the second downlink signal are of different types, and a specific reception beam for receiving the first downlink signal and the second downlink signal is determined based on the first component carrier or the first downlink signal.

According to the present disclosure, a BS for transmitting a downlink signal in a wireless communication system includes at least one transceiver, at least one processor, and at least one memory operatively coupled to the at least one processor and storing instructions which, when executed by the at least one processor, cause the at least one processor to perform specific operations. The operations include transmitting a first downlink signal in a first component carrier, and transmitting a second downlink signal in a second component carrier. The first downlink signal and the second downlink signal are of different types, and a specific reception beam for receiving the first downlink signal and the second downlink signal is determined based on the first component carrier or the first downlink signal.

Advantageous Effects

According to the present disclosure, two or more downlink (DL) signals of different types may be efficiently transmitted and received.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
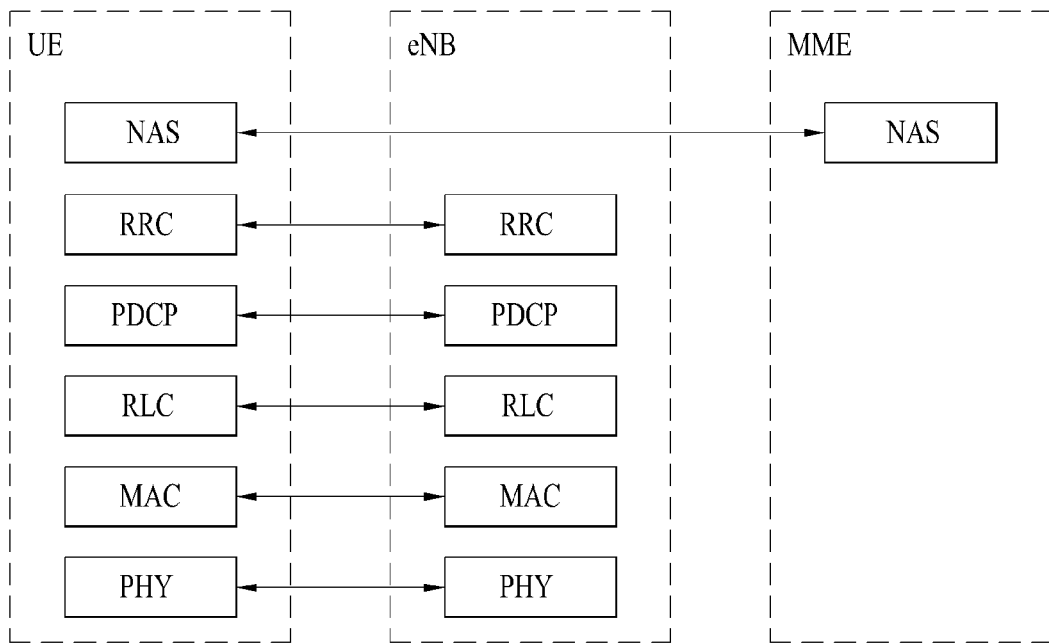
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
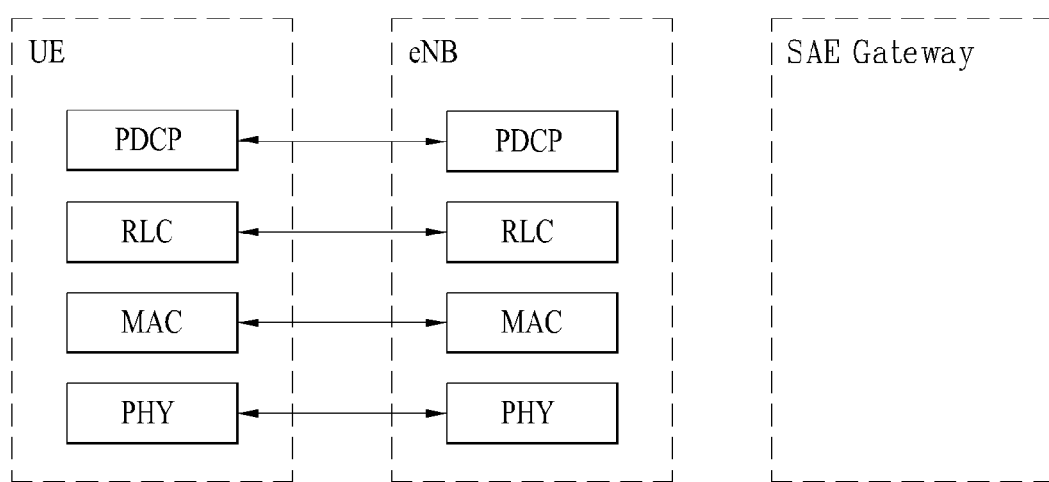

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/ negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
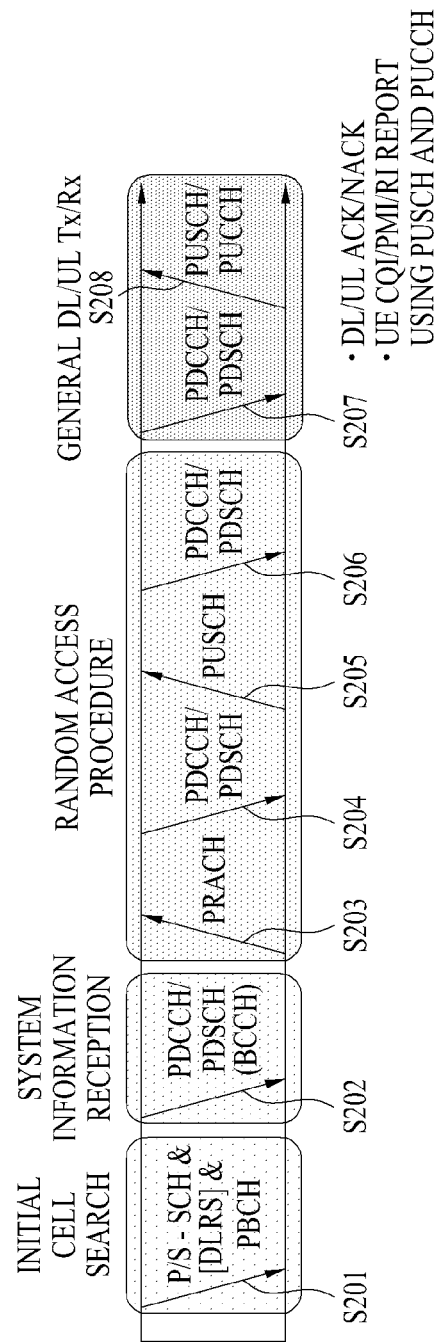
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters anew cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
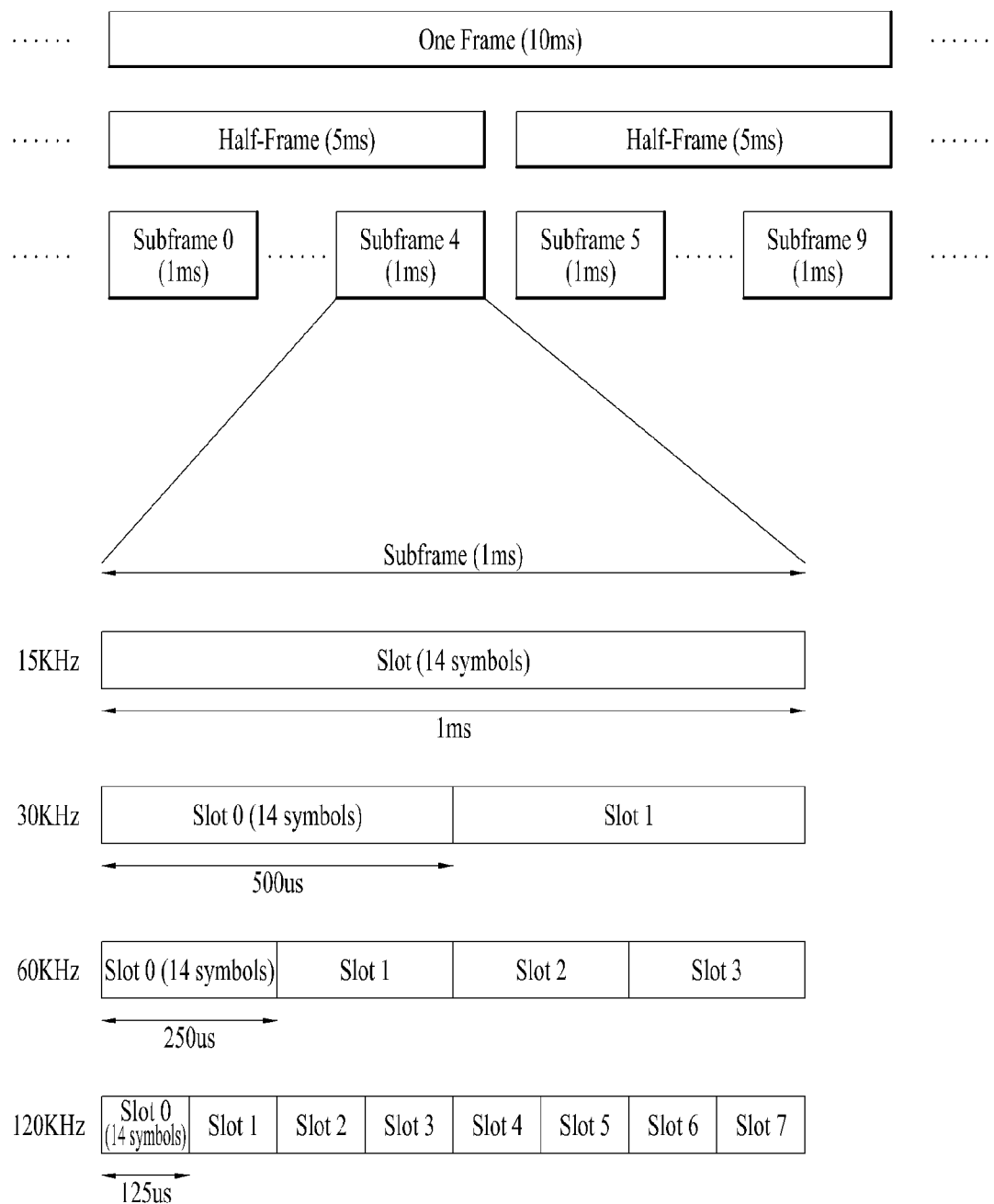
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15 * 2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: Number of symbols in a slot
*$N_{slot}^{frame,u}$: Number of slots in a frame
*$N_{slot}^{subframe,u}$: Number of slots in a subframe

[Table 2] illustrates that the number of symbols per slot, the number of slots per frame, and the number of slots per subframe vary according to the SCS when the extended CP is used.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u=2) | 12 | 40 | 4 |

Figure 4:
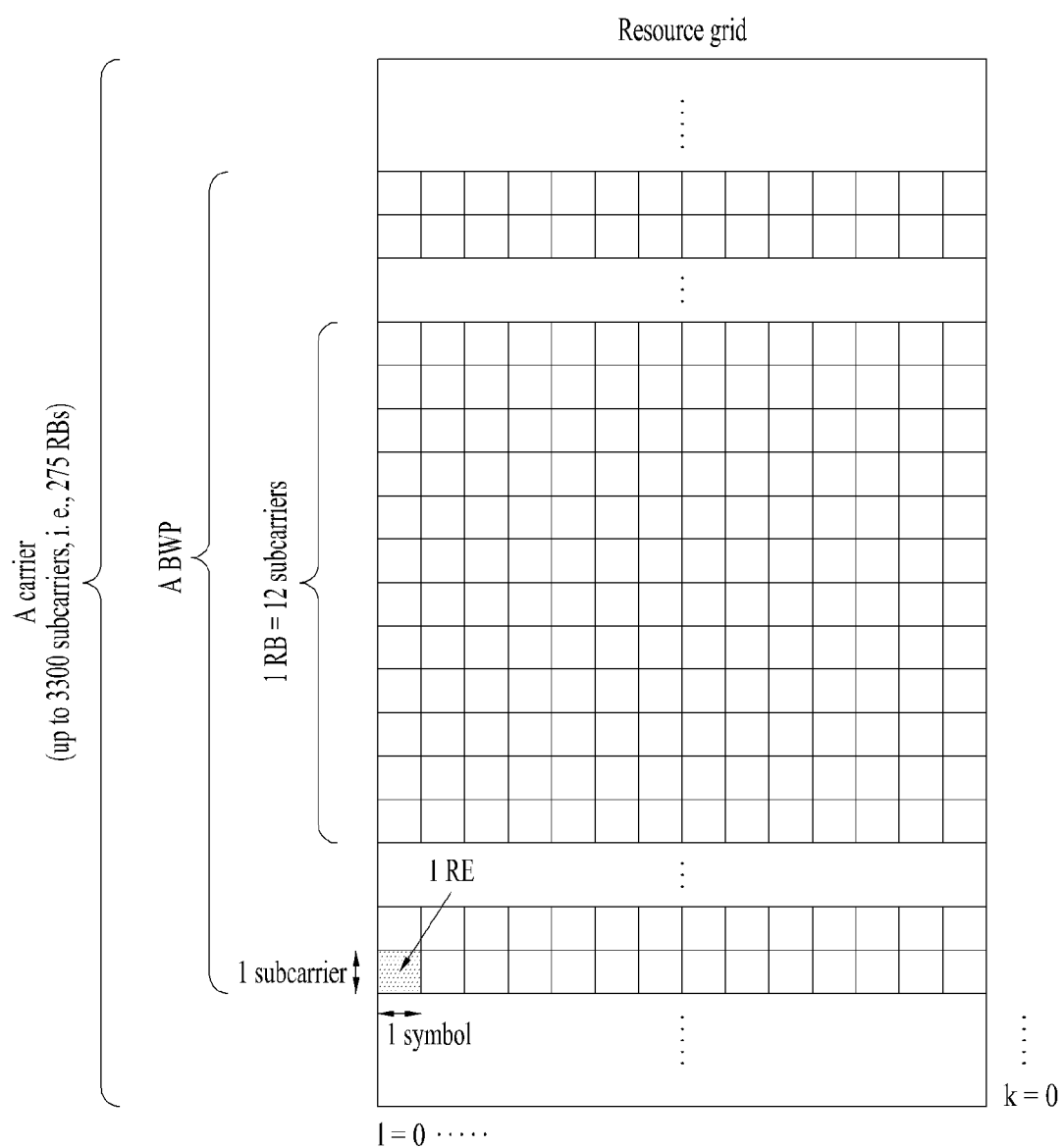

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
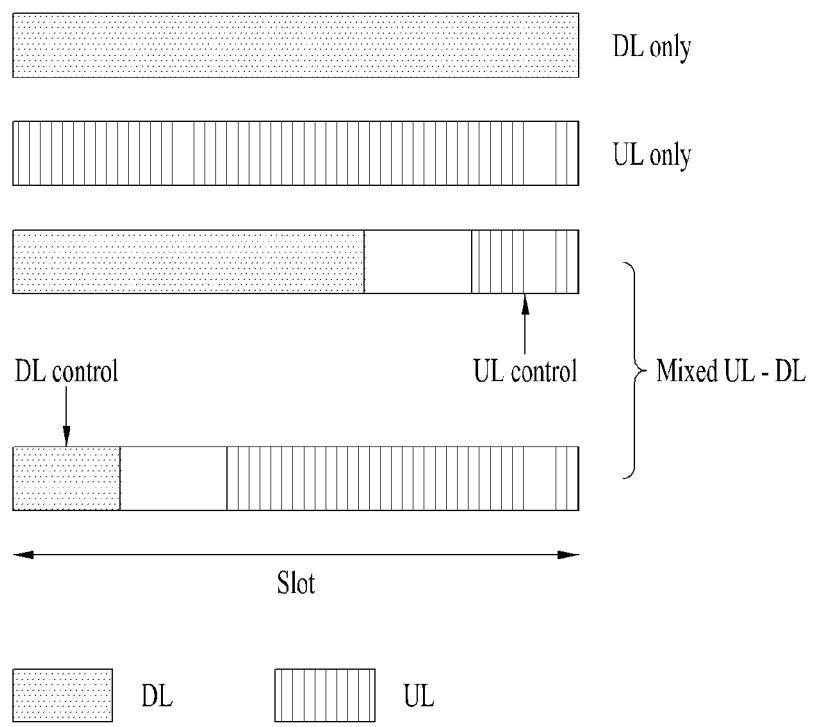

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
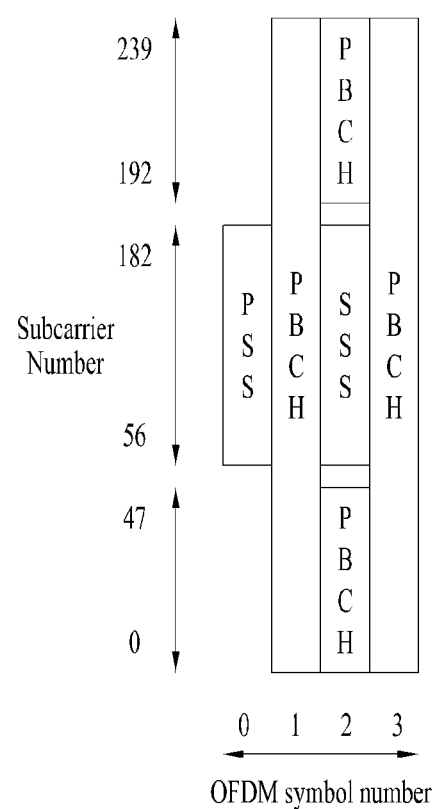
FIGS. 6, 7, 8, and 9 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| $1^{st}$ step | PSS | SS/PBCH block (SSB) symbol timing acquisition<br>Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF)<br>Remaining Minimum System Information (RMSI) Control resource set (CORESET)/Search space configuration |
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
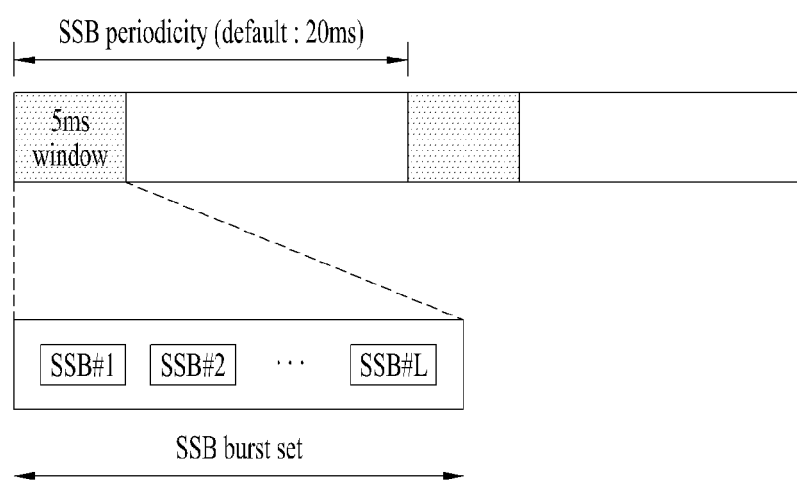

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as $\{2, 8\}+14^*n$ where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as $\{4, 8, 16, 20\}+28^*n$ where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as $\{2, 8\}+14^*n$ where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as $\{4, 8, 16, 20\}+28^*n$ where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as $\{8, 12, 16, 20, 32, 36, 40, 44\}+56^*n$ where n=0, 1, 2, 3, 5, 6, 7, 8 for a carrier frequency above 6 GHz.

Figure 8:
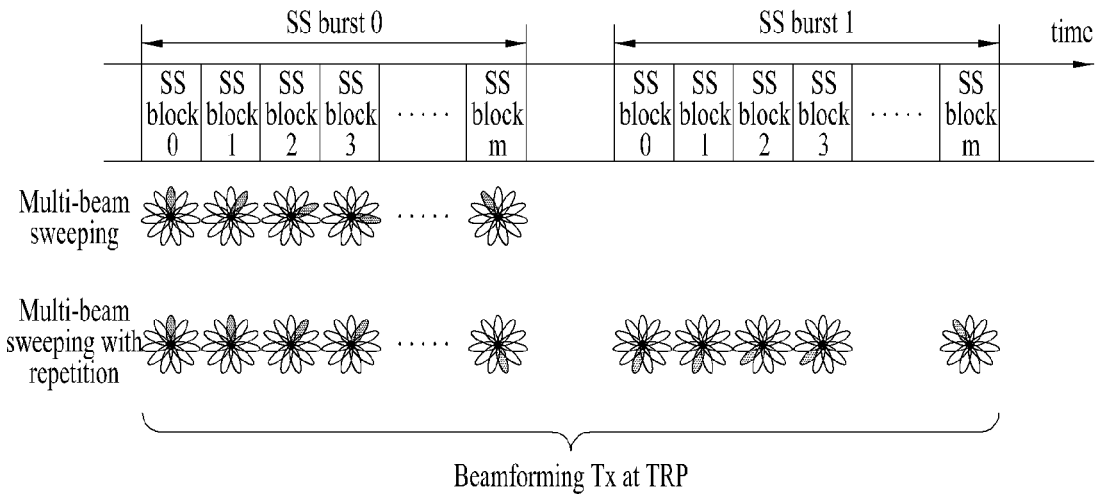

FIG. 8 illustrates exemplary multi-beam transmission of SSBs.

Figure 10:
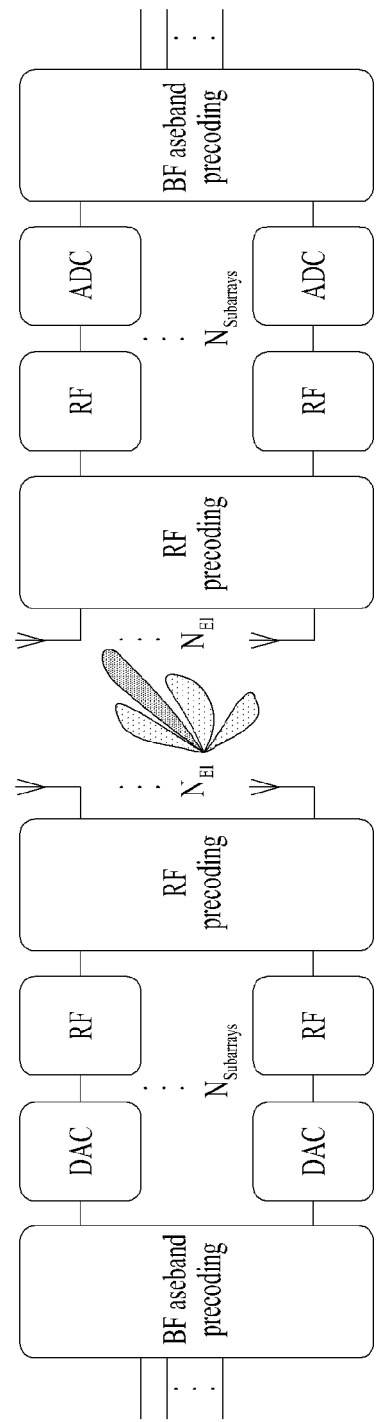
FIG. 10 is a diagram illustrating analog beamforming in the NR system.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 9:
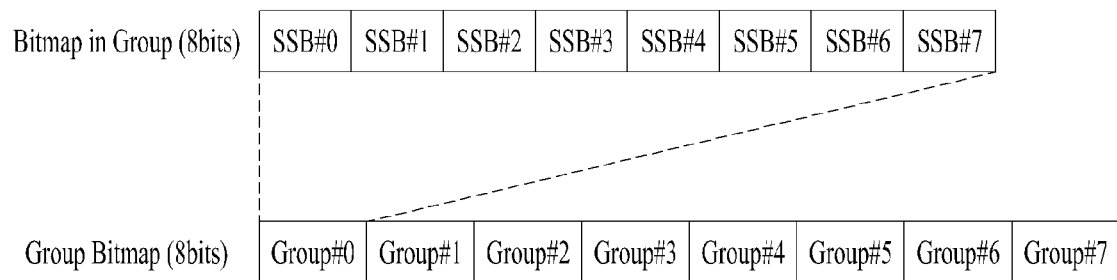

FIG. 9 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

FIG. 10 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 11:
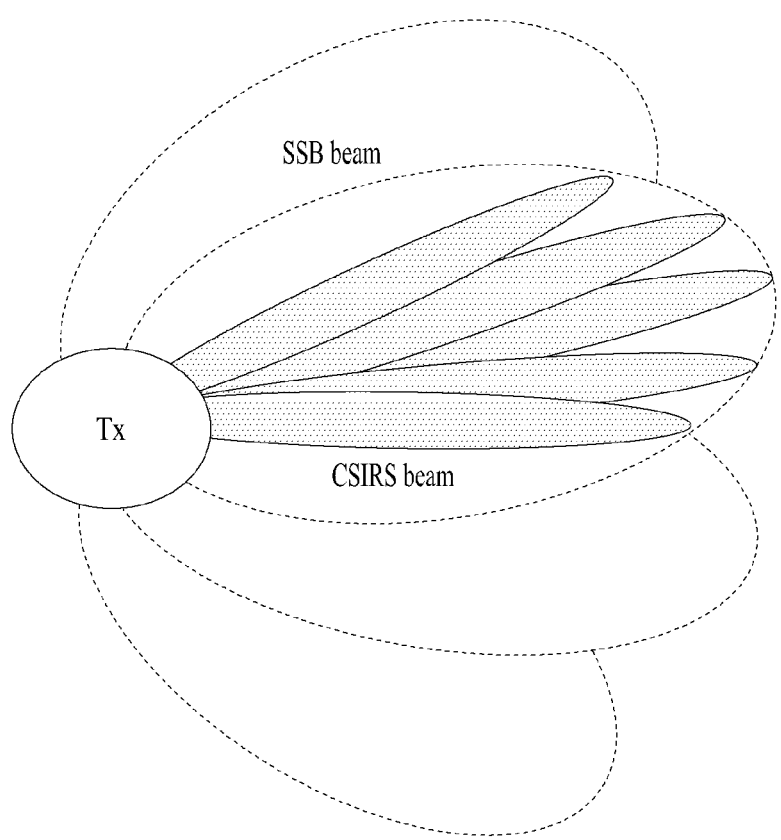
FIGS. 11, 12, 13, 14, and 15 are diagrams illustrating beam management in the NR system.

FIG. 11 is a diagram illustrating exemplary BF using an SSB and a CSI-RS.

Referring to FIG. 11, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 12:
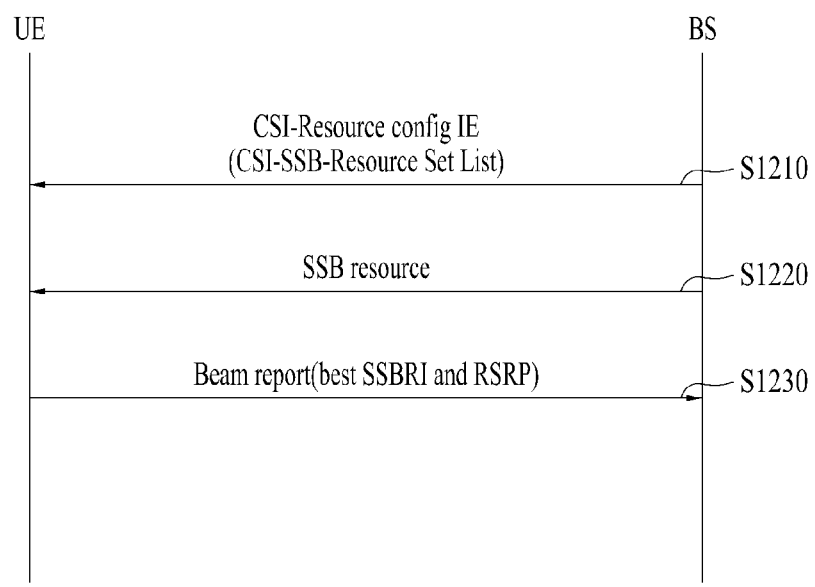

FIG. 12 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1210). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1220).

When CSI-RS reportConfig related to an SSBRI and RSRP reporting has been configured, the UE reports a best SSBRI and an RSRP corresponding to the best SSBRI to the BS (S12300). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 13:
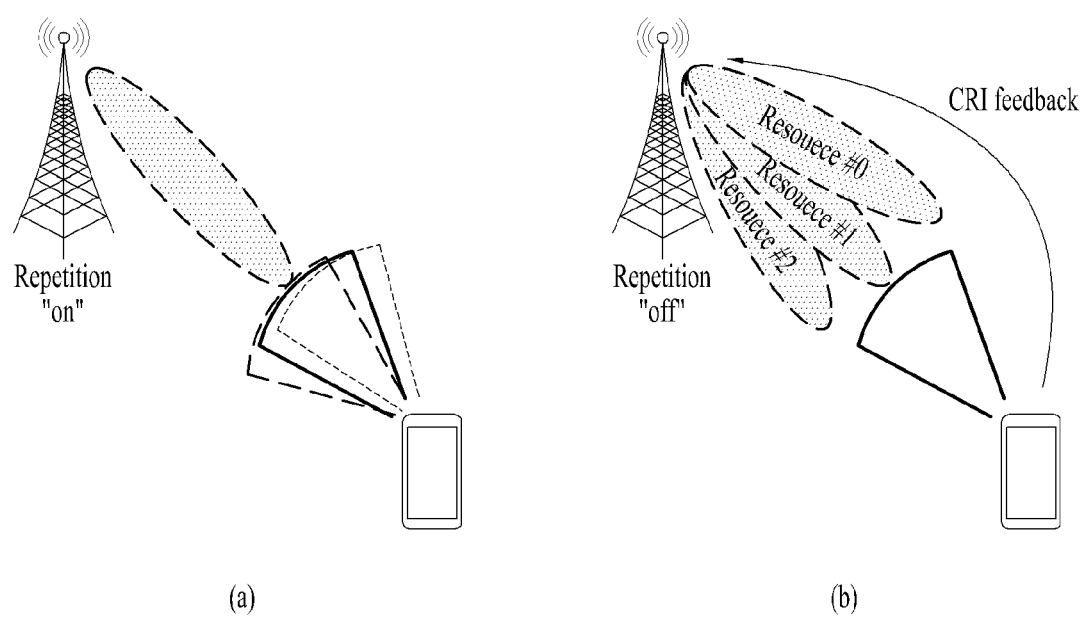

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 13 illustrates another exemplary DL BM process using a CSI-RS.

FIG. 13($a$) illustrates an Rx beam refinement process of a UE, and FIG. 13($b$) illustrates a Tx beam sweeping process of a BS. Further, FIG. 13($a$) is for a case in which Repetition is set to 'ON', and FIG. 13($b$) is for a case in which Repetition is set to 'OFF'.

With reference to FIGS. 13($a$) and 14($a$), an Rx beam determination process of a UE will be described below.

Figure 14:
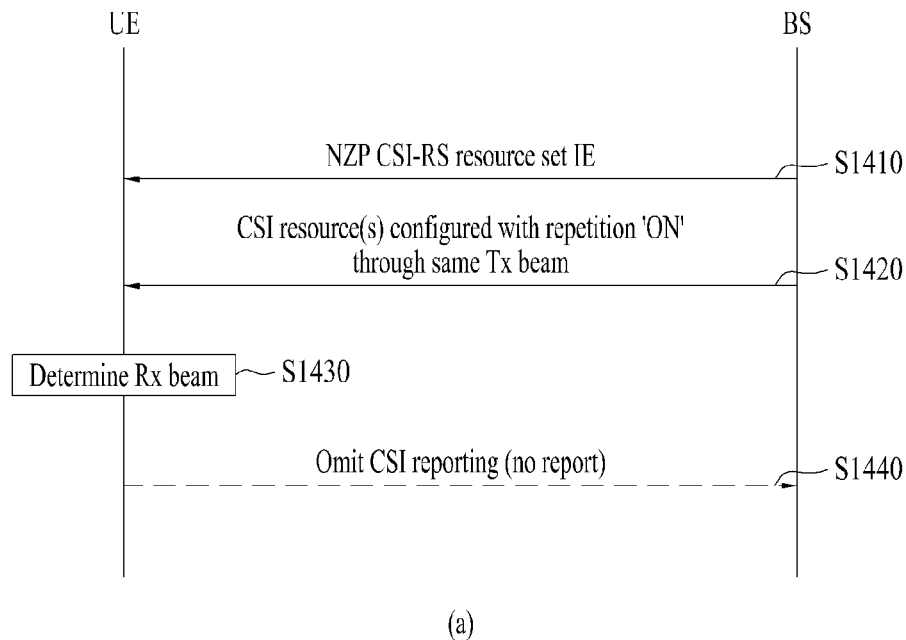
Figure 14:
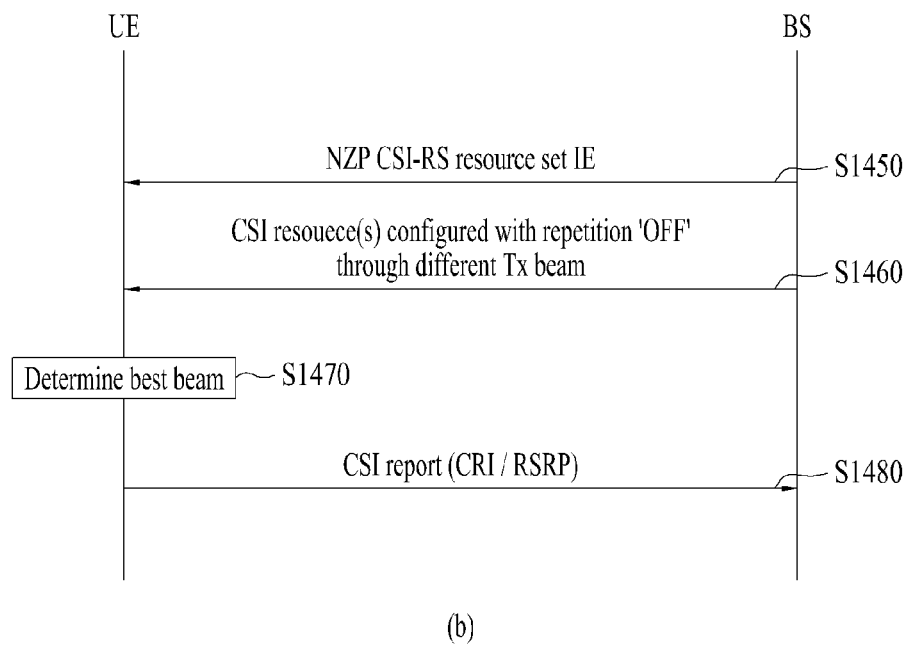

FIG. 14($a$) is a diagram illustrating a signal flow for an exemplary Rx beam determination process of a UE.

The UE receives an NZP CSI-RS resource set IE including an RRC parameter 'Repetition' from a BS by RRC signaling (S1410). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1420).

The UE determines its Rx beam (S1430).

The UE skips CSI reporting (S1440). That is, the UE may skip CSI reporting, when the RRC parameter 'Repetition' is set to 'ON'.

With reference to FIGS. 13($b$) and 14($b$), a Tx beam determination process of a BS will be described below.

FIG. 14($b$) is a diagram illustrating an exemplary Tx beam determination process of a BS.

A UE receives an NZP CSI-RS resource set IE including an RRC parameter 'Repetition' from the BS by RRC signaling (S1450). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1460).

The UE selects (or determines) a best beam (S1470).

The UE reports the ID (e.g., CRI) of the selected beam and related quality information (e.g., an RSRP) to the BS (S1480). That is, the UE reports a CRI and an RSRP corresponding to the CRI, when a CSI-RS is transmitted for BM.

Figure 15:
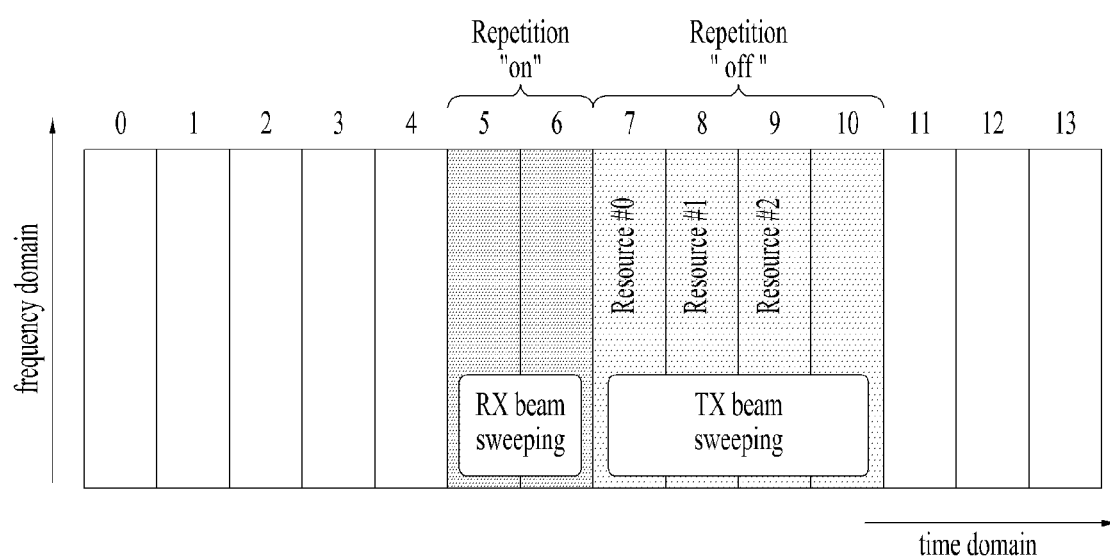

FIG. 15 is a diagram illustrating exemplary resource allocation in the time and frequency domains, which is related to the operation of FIG. 13.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

TABLE 4

-- ASN1START-- TAG-TCI-STATE-STARTTCI-State ::=
SEQUENCE { tci-StateId TCI-StateId, qcl-Type1 QCL-Info,
qcl-Type2 QCL-Info OPTIONAL,-- Need R ... }QCL-Info ::=
SEQUENCE { cell ServCellIndex OPTIONAL,-- Need R
bwp-Id BWP-Id OPTIONAL,-- Cond CSI-RS-Indicated
referenceSignal CHOICE { csi-rs NZP-CSI-RS-ResourceId,
ssb SSB-Index }, qcl-Type ENUMERATED {typeA, typeB,
typeC, typeD},...}-- TAG-TCI-STATE-STOP-- ASN1STOP In Table 4, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'OCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a D SSB for reception of the NZP CSI-RS.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 16:
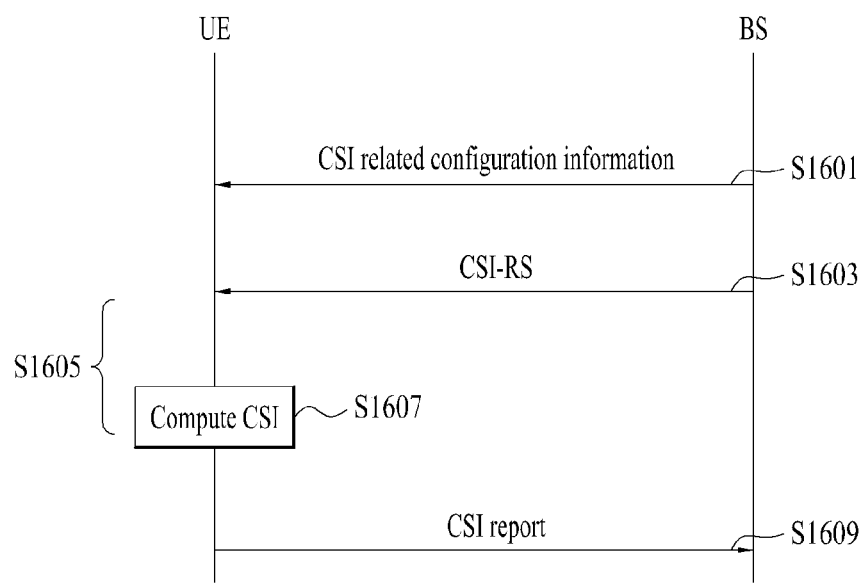
FIG. 16 is a diagram illustrating a signal flow for channel state information (CSI) reporting.
Figure 17:
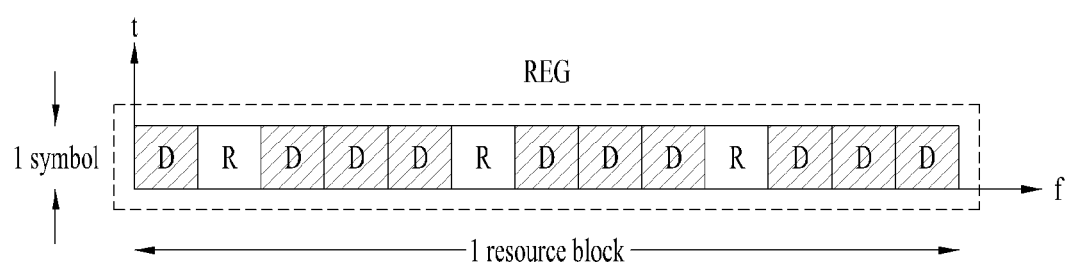
FIGS. 17, 18 and 19 are diagrams illustrating a physical downlink control channel (PDCCH) in the NR system.
Figure 18:
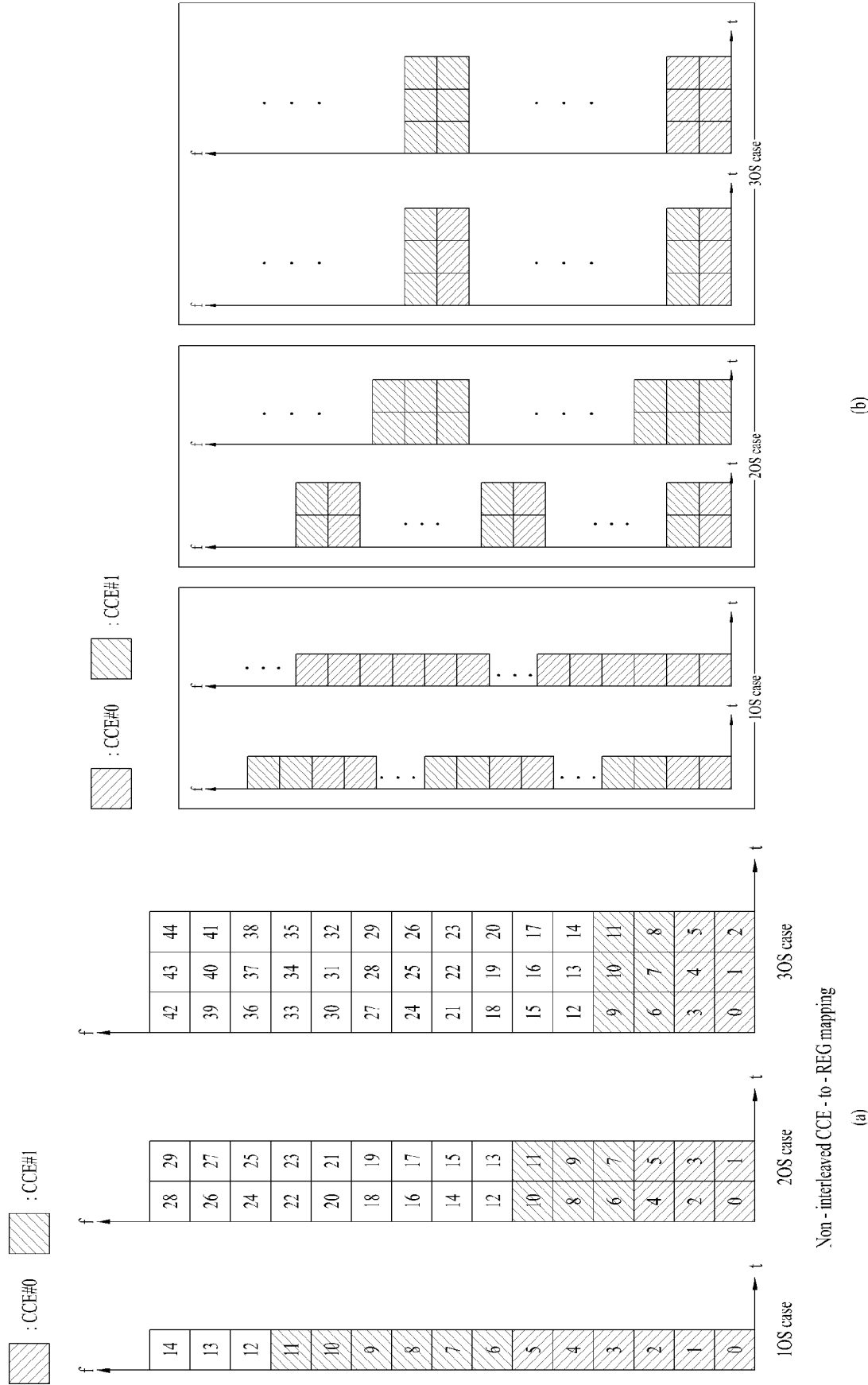
Figure 19:
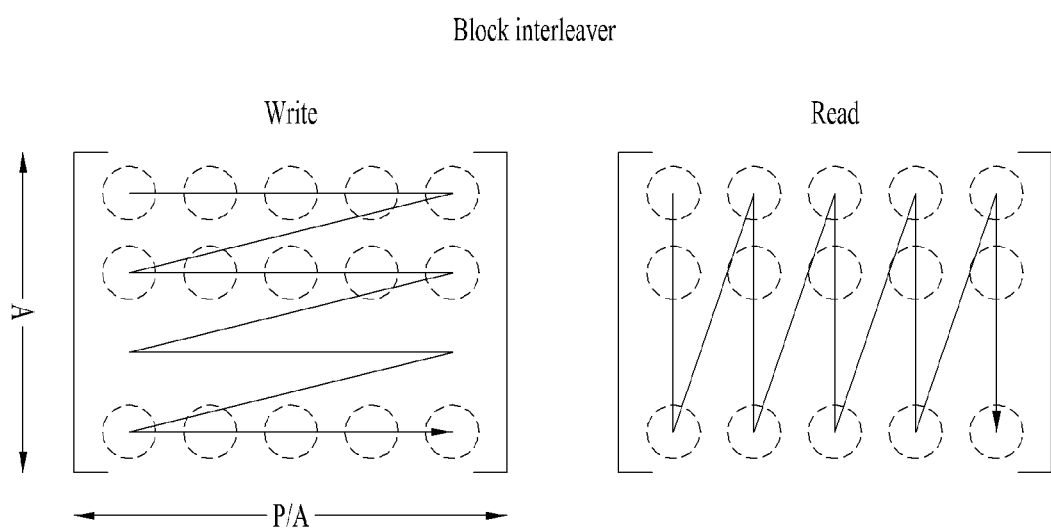

FIG. 16 is a diagram illustrating a signal flow for a CSI-related process.

For one of the above-described uses of the CSI-RS, a UE receives CSI-related configuration information from a BS by RRC signaling (S1601).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1605). The CSI measurement may include (1) CSI-RS reception of the UE (S1603) and (2) CSI computation in the received CSI-RS (S1607). Mapping of the CSI-RS to REs of CSI-RS resources in the time and frequency domains is configured by an RRC parameter, CSI-RS-ResourceMapping.

The UE reports the measured CSI to the BS (S1609).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1.1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD', 1.2. Resource setting configuration A resource setting may mean a resource set list, and one reporting setting may be linked to up to three resource settings.

- When one resource setting is configured, the resource setting (given by an RRC parameter resourcesForChannelMeasurement) is for channel measurement for RSRP computation.
- When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.
- When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.
- When one resource setting (given by resourcesForChannelMeasurement) is configured, the resource setting is for channel measurement for RSRP computation.
- When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1.3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

- Each NZP CSI-RS port configured for interference measurement corresponds to an interference transmission layer.
- All interference transmission layers on NZP CSI-RS ports for interference measurement take into account energy per resource element (EPRE) ratios.
- The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including $N \geq 1$ CSI-ReportConfig reporting settings, $M \geq 1$ CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

CCE-to-REG mapping for the CORESET may be an interleaved type or a non-interleaved type. FIG. 7(a) is an exemplary view illustrating non-interleaved CCE-REG mapping, and FIG. 7(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

[Table 5] lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI,TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

[Table 6] lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

In the present disclosure, various embodiments of transmitting and receiving two or more DL signals of different types or different configurations will be described.

Figure 20:
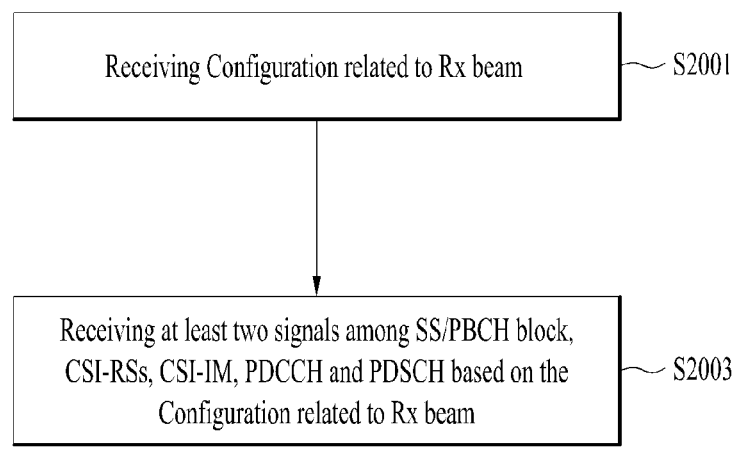
FIGS. 20, 21 and 22 are diagrams illustrating operations of a user equipment (UE), a base station (BS), and a network according to the present disclosure.
Figure 21:
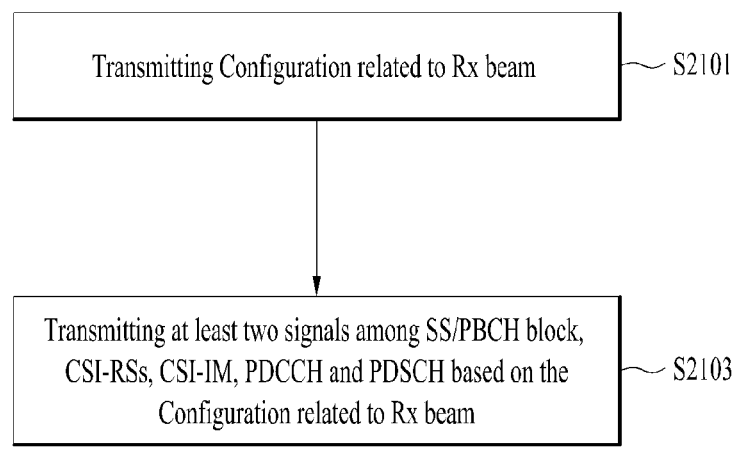
Figure 22:
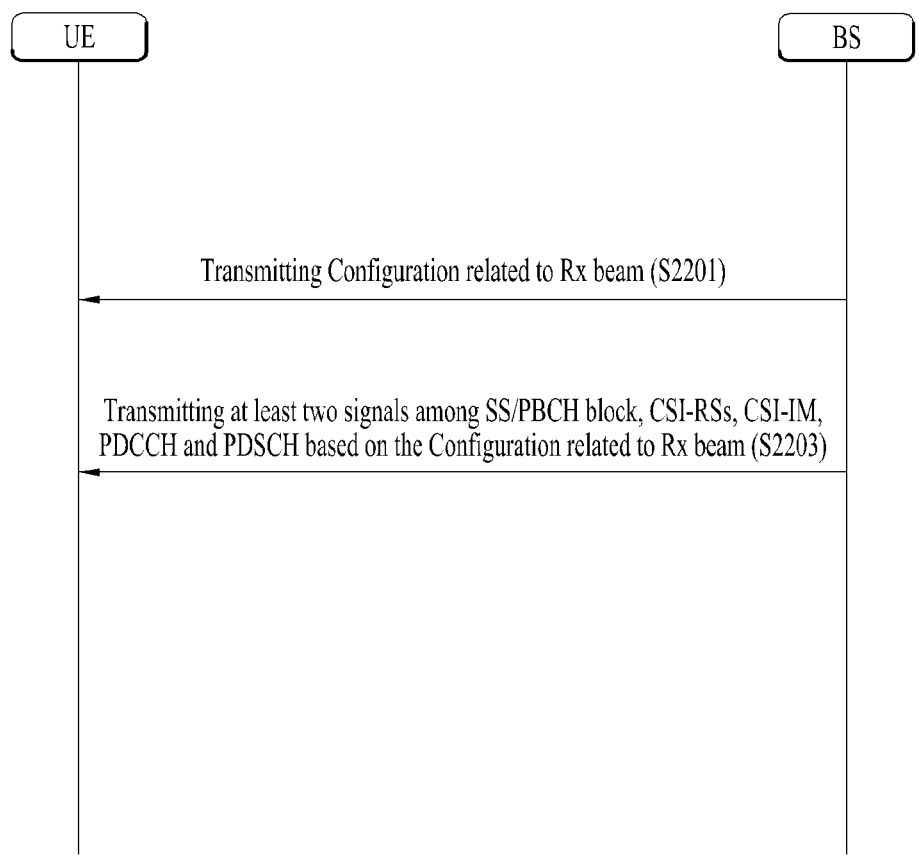

FIGS. 20, 21 and 22 are flowcharts illustrating an implementation example of a UE, a BS, and a network according to embodiments of the present disclosure.

Referring to FIG. 20, the UE may receive a reception (Rx) beam-related configuration (S2001). For example, the Rx beam-related configuration may include settings such as QCL, Repetition 'on/off', ReportQuantity, and/or TRS-info. Specifically, what configuration the UE receives may be based on the following embodiments.

The UE may receive two or more DL signals of different types or different configurations among DL signals such as an SS/PBCH block, a CSI-RS, a CSI-IM, a PDCCH, and a PDSCH based on the received configuration (S2003). For example, the two or more DL signals may be received in frequency divisional multiplexing (FDM) in the same time area. Further, the two or more DL signals may be received in different component carriers (CCs). The types and/or configurations, transmission types, and reception methods of the two or more DL signals may be based on the following embodiments.

Referring to FIG. 21, the BS may transmit an Rx beam-related configuration (S2101). For example, the Rx beam-related configuration may include settings such as QCL, Repetition 'on/off', ReportQuantity, and/or TRS-info. Specifically, what configuration the BS transmits may be based on the following embodiments.

The BS may transmit two or more DL signals of different types or different configurations among DL signals such as an SS/PBCH block, a CSI-RS, a CSI-IM, a PDCCH, and a PDSCH based on the transmitted configuration (S2103). For example, the two or more DL signals may be transmitted in FDM in the same time area. Further, the two or more DL signals may be transmitted in different CCs. The types and/or configurations and transmission types and/or methods of the two or more DL signals may be based on the following embodiments.

FIG. 22 illustrates an implementation example of a network according to the present disclosure. Referring to FIG. 22, a BS may transmit an Rx beam-related configuration to a UE (S2201). For example, the Rx beam-related configuration may include settings such as QCL, Repetition 'on/off', ReportQuantity, and/or TRS-info. Specifically, what configuration the BS transmits to the UE may be based on the following embodiments.

The BS may transmit to the UE two or more DL signals of different types or different configurations among DL signals such as an SS/PBCH block, a CSI-RS, a CSI-IM, a PDCCH, and a PDSCH based on the transmitted configuration (S2203). For example, the two or more DL signals may be transmitted to the UE in FDM in the same time area. Further, the two or more DL signals may be transmitted to the UE in different CCs. The types and/or configurations and transmission types and/or methods of the two or more DL signals may be based on the following embodiments.

Embodiment 1

Figure 23:
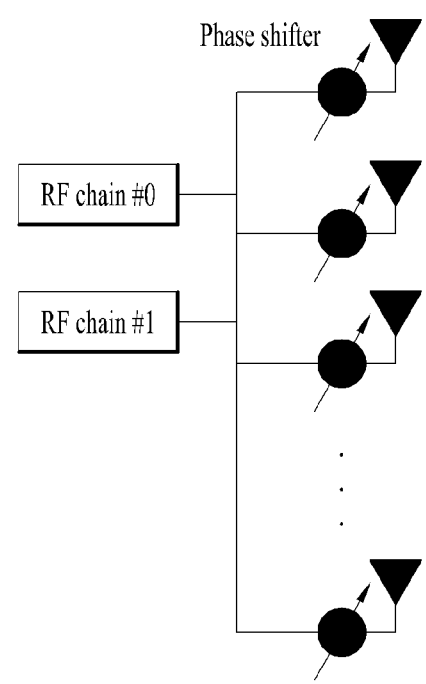
FIG. 23 is a diagram illustrating an implementation example of an antenna structure in carrier aggregation (CA).

When carrier aggregation (CA) is configured, analog beams generated through different radio frequency (RF) chains may be shared based on the antenna structure of a UE. For example, given the antenna structure illustrated in FIG. 23, the UE uses only RF chain #0 when a single CC is configured. However, when inter-band CA further using a CC very different from the configured CC is configured, RF chain #1 may be additionally used. In this case, RF chain #1 may share an antenna element and an analog beam with RF chain #0. For example, when RF chain #1 shares a phase shifter with RF chain #0 as illustrated in FIG. 23, only a single analog beam may be formed.

The present disclosure proposes operations of a BS and a UE, for simultaneously transmitting and receiving different RSs and/or channels in consideration of the above-described structural characteristics of the UE.

Depending on UE capabilities, UEs may be classified into two types, Type A and Type B. The BS may configure or indicate at least one of different UE behaviors configured for Type A and Type B by enabling/disabling the UE behavior by higher-layer signaling. The higher-layer signaling may be RRC signaling and/or a medium access control (MAC) control element (CE).

In the present disclosure, a Type-A UE and a Type-B UE, which are defined to distinguish UE behaviors from each other, may refer to UEs described below.

(1) Type-A UE: a UE capable of receiving a plurality of signals simultaneously on different (independent) analog beams, which have been transmitted at the same time in different CCs or BWPs.

Further, when the Type-A UE is configured with inter-band CA and/or intra-band CA, the Type-A UE may report to the BS information about a CC combination, a CC group, a BWP combination, or a BWP group in which independent analog beams may be formed. Further, when the Type-A UE is configured with inter-band CA and/or intra-band CA, the Type-A UE may report to the BS information about a CC combination, CC group, a BWP combination, or a BWP group, which shares an analog beam.

(2) Type-B UE: a UE capable of receiving a plurality of signals only on a single analog beam, which have been transmitted at the same time in different CCs or BWPs, regardless of whether the UE includes only a single TXRU/RF chain or multiple TXRU/RF chains.

A UE may report/indicate to the BS whether its UE type is Type A or Type B. When the BS simultaneously transmits different RSs and/or channels to a UE which has reported that the UE is Type B, the BS may always transmit spatially QCLed RSs and/or channels. In other words, the BS may transmit data to the UE on the same transmission (Tx) beam, so that the UE may receive the data on a single Rx beam.

Now, a description will be given of a method of receiving DL signals in two or more CCs by UEs of the above-described types.

However, the following embodiments may be equally applied/extended to a case in which a single CC is configured as well as a case in which CA is configured.

The UE may be configured with two different CCs and receive an SS/PBCH block and a PDSCH in the respective CCs. For example, when two CCs CC #0 and CC #1 are configured for the UE, the SS/PBCH block may be received in CC #0, and the PDSCH may be received in CC #1. On the contrary, the PDSCH may be received in CC #0, and the SS/PBCH block may be received in CC #1. That is, the SS/PBCH block and the PDSCH may be transmitted in different CCs.

A UE operation for receiving the SS/PBCH block and the PDSCH may be different according to the type of the UE (Type A or Type B). The BS may enable/disable, configure, or indicate at least one of different UE operations configured for Type A and Type B to be described later by higher-layer signaling. The higher-layer signaling may be RRC signaling and/or a MAC CE.

In the case where a UE is configured with two CCs and receives an SS/PBCH block and a PDSCH in the respective CCs, a Type-A UE operation and a Type-B UE operation according to the present disclosure will be described below.

(3) Type-A UE: The UE may form an Rx analog beam optimized/suitable for reception of the SS/PBCH block transmitted in CC #0 and an Rx analog beam optimized/suitable for reception of the PDSCH transmitted in CC #1 and receive the SS/PBCH block and the PDSCH on the respective analog beams. The analog beam for receiving the PDSCH may be fixed, whereas the Rx beam for the SS/PBCH block may be changed by beam sweeping.

When a spatial QCL reference for the PDSCH transmitted in CC #1 is the SS/PBCH block transmitted in CC #0, the UE may form a common Rx analog beam and receive the PDSCH and the SS/PBCH block on the common Rx analog beam, assuming that the PDSCH transmitted in CC #1 and the SS/PBCH block transmitted in CC #0 are spatially QCLed.

(4) Type-B UE:

1) The PDSCH and the SS/PBCH block may be received on an Rx beam suitable/optimized for a Tx beam carrying the PDSCH. For example, when the UE determines or the BS indicates to the UE that the PDSCH reception is more important, the UE forms an Rx analog beam suitable for the PDSCH reception.

For example, the BS may implicitly indicate/configure to/for the UE that the priority of the PDSCH reception is higher than the priority of the SS/PBCH block reception by indicating/configuring that Rx beam sweeping is not performed.

Further, QCL may be configured over a long term. Therefore, when the UE currently receives SS/PBCH block #1 together with the PDSCH, the spatial QCL reference for the PDSCH may be configured not as the current SS/PBCH block, SS/PBCH block #1 but as an already-transmitted SS/PBCH block SS/PBCH block #0. In this case, the Type-B UE may operate as in the following examples. The BS may configure/indicate operations of the following examples for/to the UE.

The UE gives priority to the PDSCH reception over the reception of SS/PBCH block #1. That is, the UE may receive SS/PBCH block #1 and the PDSCH based on the preconfigured PDSCH reference QCL. In other words, SS/PBCH block #1 and the PDSCH may be received in an Rx beam direction set for the previously transmitted SS/PBCH block #0.

Alternatively, the UE gives priority to the reception of SS/PBCH block #1 over the PDSCH reception. For example, the UE may ignore the preconfigured reference QCL for the PDSCH. For example, the UE may assume that the Rx beam direction for SS/PBCH block #1 and the Rx beam direction for the PDSCH is not very different. In this case, the UE may receive the PDSCH with a certain or higher level of quality in spite of ignoring the preconfigured PDSCH reference QCL, that is, the Rx beam direction for the previously transmitted SS/PBCH block #0.

Alternatively, when SS/PBCH block #1 is included in a resource setting and ReportQuantity associated with SS/PBCH block #1 is "SSB resource indicator (SSBRI)", "SSBRI/L1-RSRP" and/or "ssb-Index-RSRP", the UE may receive SS/PBCH block #1 and the PDSCH according to the preconfigured reference QCL for the PDSCH. This operation may be intended to give priority to the PDSCH reception over the SS/PBCH block reception. Further, the UE may calculate a CRI for SS/PBCH block #1, using an Rx beam used for receiving SS/PBCH block #0.

Alternatively, when SS/PBCH block #1 is included in a resource setting and ReportQuantity associated with SS/PBCH #1 is "SSBRI", "SSBRI/L1-RSRP" and/or "ssb-Index-RSRP", the UE may ignore the preconfigured reference QCL for the PDSCH and give priority to the reception of SS/PBCH block #1. When the UE and the BS perform a P1 beam management operation, the UE may calculate an SSBRI and an L1-RSRP for each Rx beam, while performing Rx beam sweeping during four OFDM symbols in which SS/PBCH block #1 is received. The P1 beam management operation refers to an operation in which the BS performs Tx beam sweeping and the UE also performs Rx beam sweeping. The BS and the UE may identify appropriate Tx and Rx beams by the P1 beam management operation.

Alternatively, when SS/PBCH block #1 is included in a resource setting and ReportQuantity associated with SS/PBCH block #1 is set to "No report" or "none", the UE may give priority to the reception of SS/PBCH block #1 over the PDSCH reception. Therefore, the UE may perform Rx beam sweeping during four OFDM symbols configured for SS/PBCH block #1, ignoring the preconfigured spatial QCL reference for the PDSCH. For example, the UE may use different Rx filters while receiving the four OFDM symbols for SS/PBCH block #1. This operation may be interpreted as giving priority to the Rx beam sweeping or P3 beam management over the PDSCH reception. The P3 beam management operation may be an operation in which the RS performs Rx beam sweeping, with the Tx beam of the BS fixed. For example, the P3 beam management operation may be performed to perform Rx beam sweeping at a fine level on the four OFDM symbols included in the SS/PBCH block.

Alternatively, when SS/PBCH block #1 is included in a resource setting and ReportQuantity associated with SS/PBCH block #1 is set to "No report" or "none", the UE may give priority to the PDSCH reception over the SS/PBCH block reception. Therefore, the UE does not perform/expect Rx beam sweeping, ignoring the reception of SS/PBCH block #1. When ReportQuantity is set to "No report", RX beam sweeping is not compulsory to the UE and thus the BS may force the UE to receive the PDSCH to restrict the Rx beam sweeping of the UE.

2) The SS/PBCH block and the PDSCH are received on an Rx beam suitable/optimized for a Tx beam carrying the SS/PBCH block. That is, when the BS indicates/configures to/for the UE that measurement such as for radio resource management (RRM) and/or Rx beam refinement through the SS/PBCH block reception is more important, the UE may form an Rx analog beam suitable for the SS/PBCH block reception. Alternatively, when the UE perceives measurement such as for RRM and/or Rx beam refinement through the SS/PBCH block reception as more important, the UE may form an Rx analog beam suitable for the SS/PBCH block reception. The BS may implicitly indicate/configure that the SS/PBCH block reception has priority over the PDSCH reception by configuring/indicating RX beam sweeping for/to the UE.

3) The UE gives priority to reception of a signal transmitted in a primary CC. That is, the UE forms an Rx beam suitable/optimized for receiving a signal transmitted in the primary CC, between the PDSCH and the SS/PBCH block.

4) The UE may give priority to a signal received in a CC with the lowest or highest of the indexes of CCs configured for the UE. Alternatively, the BS may indicate/configure the index of a high-priority CC to/for the UE.

While the Rx priorities and Rx beams of the PDSCH and the SS/PBCH block have been described above in Embodiment 1, the description may be applied similarly and/or extended to the PDCCH and the SS/PBCH block, the PDSCH and the CSI-RS, and the PDCCH and the CSI-RS. However, when the SS/PBCH block is interpreted/applied as the CSI-RS in Embodiment 1, "SSBRI" of ReportQuantity may be replaced with "CRT". Further, a CC in Embodiment 1 may be interpreted/applied/extended as/to a BWP.

The UE may be configured with two different CCs and receive a PDCCH and a PDSCH in the respective CCs. For example, when two CCs CC #0 and CC #1 are configured for the UE, the PDCCH may be received in CC #0, and the PDSCH may be received in CC #1. On the contrary, the PDSCH may be received in CC #0, and the PDCCH may be received in CC #1. That is, the PDCCH and the PDSCH may be transmitted in different CCs.

A UE operation for receiving the PDCCH and the PDSCH may be different according to the type of the UE (Type A or Type B). The BS may enable/disable, configure, or indicate at least one of different UE operations configured for Type A and Type B to be described later by higher-layer signaling. The higher-layer signaling may be RRC signaling and/or a MAC CE.

In the case where a UE is configured with two CCs and receives a PDCCH and a PDSCH in the respective CCs, a Type-A UE operation and a Type-B UE operation according to the present disclosure will be described below.

(5) Type-A UE: The UE may form an Rx analog beam optimized/suitable for reception of the PDSCH transmitted in CC #0 and an Rx analog beam optimized/suitable for reception of the PDCCH transmitted in CC #1 and receive the PDCCH and the PDSCH on the respective analog beams.

(6) Type-B UE:

1) The PDSCH and the PDCCH may be received on an Rx beam suitable/optimized for a Tx beam carrying the PDSCH. That is, the UE gives priority to the PDSCH reception over the PDCCH reception. The priority may be indicated to/configured for the UE by the BS or may be determined by the UE.

2) The PDSCH and the PDCCH are received on an Rx beam suitable/optimized for a Tx beam carrying the PDCCH. That is, the UE gives priority to the PDCCH reception over the PDSCH reception. The priority may be indicated to/configured for the UE by the BS or may be determined by the UE.

3) The UE gives priority to reception of a signal transmitted in a primary CC. That is, the UE forms an Rx beam suitable/optimized for receiving a signal transmitted in the primary CC, between the PDSCH and PDCCH.

4) The UE may give priority to a signal received in a CC with the lowest or highest of the indexes of CCs configured for the UE. Alternatively, the BS may indicate/configure the index of a high-priority CC to/for the UE.

5) The UE receives the two signals on a common single analog beam, assuming that the PDSCH and the PDCCH are QCLed.

The description of the PDSCH and the PDCCH in Embodiment 1 may be applied and extended to the PUSCH and the PUCCH. Further, a CC in Embodiment 1 may be interpreted/applied/extended as/to a BWP.

Further, the embodiment of receiving an SS/PBCH block and a PDSCH and the embodiment of receiving a PDCCH and a PDSCH may be implemented in combination. For example, when a Type-B UE is configured with three or more CCs and an SS/PBCH block, a PDSCH, and a PDCCH are received in the different CCs, any one of the embodiments described in (4) may be implemented in combination with any one of the embodiments described in (6).

Embodiment 2

In Embodiment 2, when two DL signals of different types and/or different configurations are multiplexed, an operation of a UE and/or a configuration/indication from a BS will be described.

First, when a CSI-IM is multiplexed with an SS/PBCH block or a CSI-RS based on a CSI-IM RE pattern, an operation of a UE and/or a configuration/indication from a BS will be described.

Figure 24:
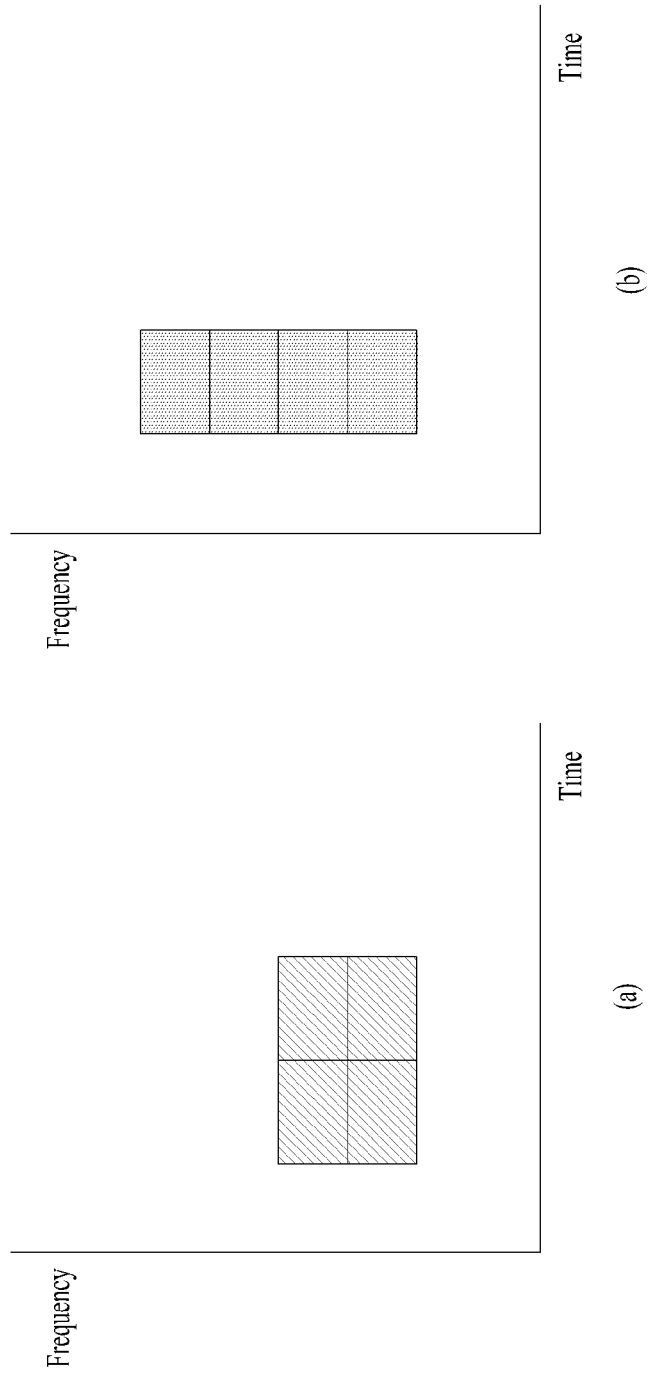
FIG. 24 is a diagram illustrating resource element (RE) mapping patterns for a channel state information interference measurement (CSI-IM).

FIG. 24 is a diagram illustrating exemplary CSI-IM RE patterns. FIG. 24(a) is a diagram illustrating a (2, 2) RE pattern-based CSI-IM. Referring to FIG. 24(a), the (2, 2) RE pattern-based CSI-IM may be mapped to two OFDM symbols and two subcarriers. The UE is configured with OFDM symbol index $l_{CSI-IM}$ and subcarrier index $k_{CSI-IM}$ by the BS. The CSI-IM may be received in REs corresponding to $(k_{CSI-IM}, l_{CSI-IM})$, $(k_{CSI-IM}, l_{CSI-IM}+1)$, $(k_{CSI-IM}^{+1}, l_{CSI-IM})$, and $(k_{CSI-IM}+1, l_{CSI-IM}+1)$. The RE pattern corresponding to the (2, 2) RE pattern-based CSI-IM illustrated in FIG. 24(a) may be referred to as CSI-IM RE pattern '0'.

FIG. 24(b) is a diagram illustrating a (4, 1) RE pattern-based CSI-IM. Referring to FIG. 24(b), the (4, 1) RE pattern-based CSI-IM may be mapped to one OFDM symbol and four subcarriers. The UE is configured with OFDM symbol index $l_{CSI-IM}$ and subcarrier index $k_{CSI-IM}$ by the BS. The CSI-IM may be received in REs corresponding to $(k_{CSI-IM}, l_{CSI-IM})$, $(k_{CSI-IM}+1, l_{CSI-IM})$, $(k_{CSI-IM}+2, l_{CSI-IM})$, and $(k_{CSI-IM}+3, l_{CSI-IM})$. The RE pattern corresponding to the (4, 1) RE pattern-based CSI-IM illustrated in FIG. 24(b) may be referred to as CSI-IM RE pattern '1'.

When the UE performs Rx beam sweeping, interference measurement may be different for each symbol. Based on this characteristic, the UE may assume/expect that a (4, 1) RE pattern-based CSI-IM may be transmitted/configured together with an SS?PBCH block in OFDM symbols carrying the SS/PBCH block. In other words, the UE may assume/expect that the SS/PBCH block and the (4, 1) RE pattern-based CSI-IM are multiplexed in FDM in the OFDM symbols carrying the SS/PBCH block.

In contrast, when the UE performs Rx beam sweeping, the UE may expect/assume that a (2, 2) RE pattern-based CSI-IM is not transmitted/configured together with an SS/PBCH block in OFDM symbols carrying the SS/PBCH block. In other words, when the UE performs Rx beam sweeping, the UE may expect/assume that the (2, 2) RE pattern-based CSI-IM is multiplexed with the SS/PBCH block in time division multiplexing (TDM). Further, when the BS predicts that the UE will perform Rx beam sweeping, the BS may configure/indicate for/to the UE that a (4, 1) RE pattern-based CSI-IM may be transmitted/configured together with an SS/PBCH block in the OFDM symbols carrying the SS/PBCH block, and that a (2, 2) RE pattern-based CSI-IM may not be transmitted/configured together with an SS/PBCH block in OFDM symbols carrying the SS/PBCH block.

A (4, 1) RE pattern-based CSI-IM may be transmitted/configured together with an SS/PBCH block for RRM, an SS/PBCH block for radio link monitoring (RLM), an SS/PBCH block for beam management (BM), or an SS/PBCH block for beam error detection in the same OFDM symbol. A (2, 2) RE pattern-based CSI-IM may be configured to be transmitted together with an SS/PBCH block for beam failure detection (BFD) in the same OFDM symbol.

This is because it may be appropriate to assume/expect that the SS/PBCH block for RRM, the SS/PBCH block for RLM, and the SS/PBCH block for BM allows the UE to perform Rx beam sweeping, and an Rx beam is fixed for the SS/PBCH block for BFD to determine beam error failure, in view of the characteristics of the SS/PBCH blocks. Unless different interference signals are to be measured, it is preferable to use the same Rx beam during interference measurement. In the case of a (2, 2) RE pattern-based CSI-IM, therefore, it may be preferable not to perform OFDM symbol-wise Rx beam sweeping during interference measurement.

Similarly, a CSI-RS for CSI acquisition, a CSI-RS for BFD, and a CSI-RS for time-frequency tracking may be received on a fixed Rx beam without OFDM symbol-wise Rx beam sweeping.

Therefore, the UE may expect/assume that a (4, 1) RE pattern-based CSI-IM and any type of CSI-RS (e.g., the CSI-RS for RRM, the CSI-RS for CSI acquisition, CSI-RS for BM, and CSI-RS for time-frequency tracking) may be transmitted/configured in the same OFDM symbol. In contrast, the UE may not expect/assume that the CSI-RS for BM allowing beam sweeping and a (2, 2) RE pattern-based CSI-IM are configured to be transmitted in the same OFDM symbol.

Further, the UE may not expect/assume that the (2, 2) RE pattern-based CSI-IM and CSI-RS resources included in a CSI-RS resource set with a higher-layer parameter "repetition" set to "on" and/or "off" are configured/transmitted in the same OFDM symbol. On the contrary, the UE may expect/assume that the (4, 1) RE pattern-based CSI-IM and CSI-RS resources included in a CSI-RS resource set with a higher-layer parameter "repetition" set to "on" and/or "off" are configured/transmitted in the same OFDM symbol.

FDM between the CSI-RS for BM and the SS/PBCH block may be allowed in a slot including 14 OFDM symbols. That is, FDM between the SS/PBCH block and any CSI-RS other than the CSI-RS for BM may not be allowed.

However, it may be difficult to avoid FDM between the SS/PBCH block and the CSI-RS for CSI acquisition or the CSI-RS for time-frequency tracking in a mini-slot or non-slot including 2/4/7 OFDM symbols. Considering the Rx beam sweeping operation when the SS/PBCH block and the CSI-RS are multiplexed in FDM, the CSI-RS for CSI acquisition may cause a problem in CSI measurement such as non-orthogonality of an orthogonal cover code (OCC) because channel information for the same port transmitted in different OFDM symbols is not the same during the Rx beam sweeping.

Therefore, the UE may operate as follows, regarding multiplexing between the CSI-RS and the SS/PBCH block. And/or the BS may configure/indicate the following UE operation.

Among CSI-RSs for CSI acquisition, a 1-port or 2-port CSI-RS is mapped only to a single OFDM symbol, and the UE performs CSI measurement only in a specific OFDM symbol. Therefore, OFDM symbol-wise Rx beam sweeping may not significantly affect CSI measurement performance. Therefore, regarding multiplexing between the CSI-RS for CSI acquisition and the SS/PBCH block, the UE may assume/expect that only the 1-port or 2-port CSI-RS for CSI acquisition and the SS/PBCH block may be transmitted in the same OFDM symbol. Additionally, as described in the fourth row of 3GPP TS 38.211 Table 7.4.1.5.3-1, the UE may assume/expect that even when a 4-port CSI-RS is mapped to a single OFDM symbol, the CSI-RS and the SS/PBCH block may be transmitted in the same OFDM symbol. That is, it may be configured that FDM between an X-port (X<=4) CSI-RS mapped only to a single OFDM symbol and an SS/PBCH block is allowed, and only TDM is allowed between an X-port (X>=4) CSI-RS occupying two or more OFDM symbols and the SS/PBCH block.

When the CSI-RS for CSI acquisition and the SS/PBCH block are transmitted together over a plurality of OFDM symbols, the number/capability of Rx beam sweepings of the UE may be determined/restricted based on the indexes of configured CSI-RS ports, a code division multiplexing (CDM) type, and/or a CDM length, which may be configured/indicated by the BS.

Figure 25:
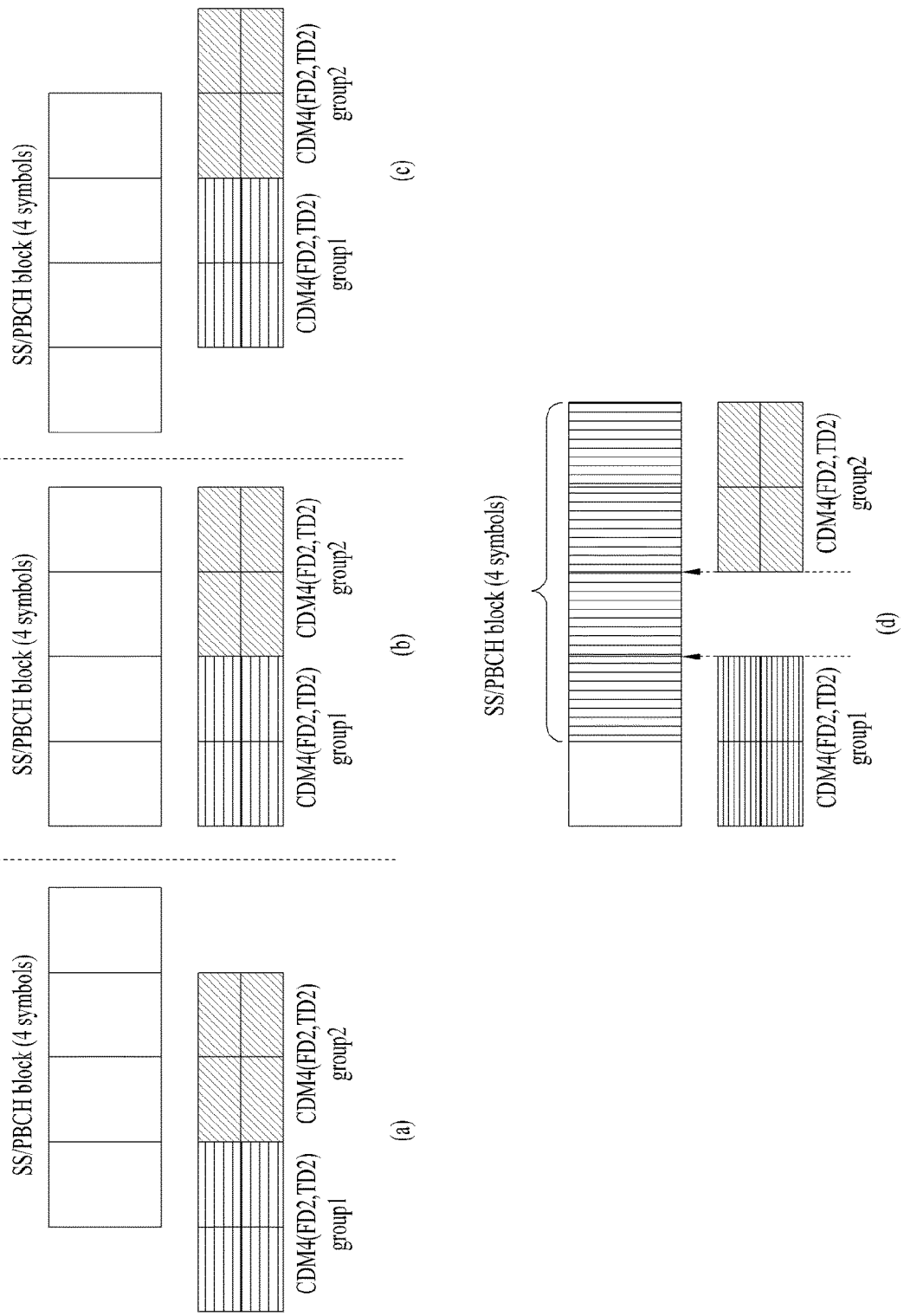
FIG. 25 is a diagram illustrating reception of a channel state information reference signal (CSI-RS) and a synchronization signal/physical broadcast channel (SS/PBCH) block which are multiplexed, at a UE.

Specifically, when a CSI-RS is transmitted together with an SS/PBCH block in four OFDM symbols carrying the SS/PBCH block, the UE may not expect to perform Rx beam sweeping in OFDM symbols spanned by a specific CDM group of an X-port CSI-RS. In other words, it may be expected that the UE performs Rx beam sweeping between OFDM symbols to which different CDM groups are mapped. For example, referring to FIGS. 25(a) to 25(c), it may be expected that the UE performs Rx beam sweeping at a boundary over which CDM4 group 1 is switched to CDM4 group 2. In another example, when CDM8 is configured over four OFDM symbols including an SS/PBCH block, the UE may expect not to perform Rx beam sweeping while a CSI-RS is received together with the SS/PBCH block in the four OFDM symbols.

Based on a similar principle, when different CSI-RS CDM groups are not consecutive in the time domain as illustrated in FIG. 25(d), the UE may expect to perform Rx beam sweeping at positions indicated by arrows in FIG. 25(d). The CDM groups based on an X-port CSI-RS configuration may be a plurality of CDM groups for the same CSI-RS resources or a plurality of CDM groups for different CSI-RS resources. The above-described UE operation may be configured/indicated by the BS. That is, for accurate measurement of channel information for a specific port, it is preferable not to change an Rx beam while a CSI-RS for the specific port is being measured. For example, it is assumed that ports #0, #1, #2, and #3 are configured for CDM4 spanning two OFDM symbols in FIGS. 25(a) to 25(c). If different Rx beams (e.g., RX #0 and RX #1) are used in the two OFDM symbols, a channel for RX #0 and ports #0, #1, #2, and #3 may be different from a channel for RX #1 and ports #0, #1, #2, and #3. In this case, OCC orthogonality may not be established. Therefore, the UE may expect not to perform Rx beam sweeping in OFDM symbols spanned by one CDM group. For example, as in FIGS. 25(a) to 25(c), when two CDM4 groups occupying two frequency domains (e.g., two subcarriers) and two time domains (e.g., two OFDM symbols) are multiplexed in FDM with an SS/PBCH block, the UE may not expect to perform beam sweeping in OFDM symbols corresponding to one CDM4 group.

Alternatively, considering FDM between the CSI-RS for CSI acquisition and the SS/PBCH block, the UE may expect/assume that only an X-port (X>=2) CSI-RS configured with FD-CDM2 is transmitted together with an SS/PBCH block in an OFDM symbol carrying the SS/PBCH block. This may be configured to enable the UE to freely perform Rx beam sweeping in an SS/PBCH block including four OFDM symbols.

Alternatively, the UE may not expect to perform Rx beam sweeping in an OFDM symbol in which the CSI-RS for CSI acquisition and the SS/PBCH block are transmitted together.

When the CSI-RS for BM is also transmitted in an OFDM symbol carrying the SS/PBCH block, the UE may expect to perform RX beam sweeping or Rx beam refinement. On the other hand, when the CSI-RS for CSI acquisition is also transmitted in an OFDM symbol carrying the SS/PBCH block, the UE may not assume to perform Rx beam sweeping. In other words, it is not assumed that the UE uses a different Rx filter in each OFDM symbol. The CSI-RS for CSI acquisition may mean CSI-RS resources included in a CSI-RS resource set for which the higher-layer parameters "repetition" and "TRS-Info" are not set. This may be interpreted as giving priority to reception of the CSI-RS for CSI acquisition, when the SS/PBCH block and the CSI-RS for CSI acquisition are received in FDM. The above-described UE operation may be indicated or configured by the BS.

A UE operation and a BS operation in the case of multiplexing between CSI-RSs of different types or different configurations should be considered. A description will be given below of a UE operation, when a CSI-RS for BM is multiplexed with a CSI-RS for CSI acquisition or a CSI-RS for time-frequency tracking. This UE operation may be based on a configuration and/or indication from the BS.

Figure 26:
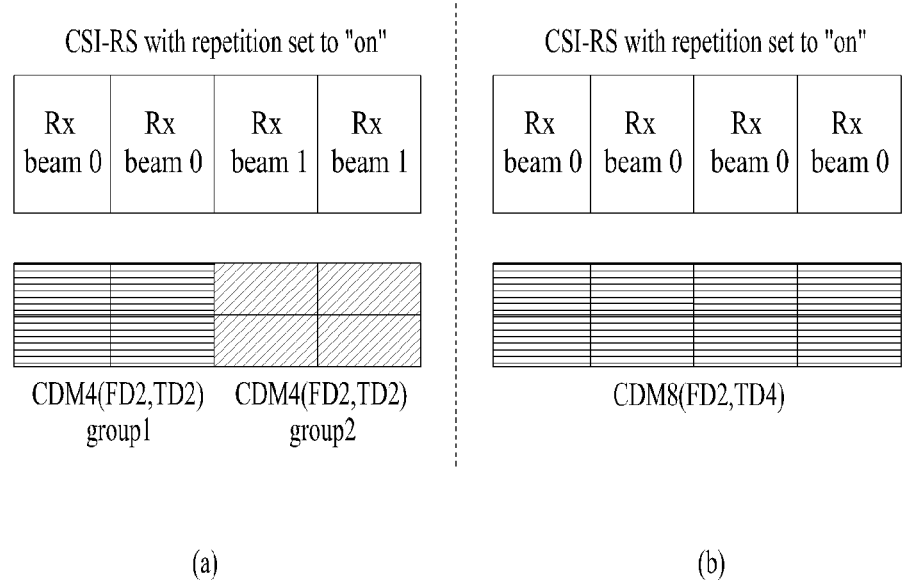
FIG. 26 is a diagram illustrating reception operations of a UE, when CSI-RSs of different types or different configurations are multiplexed.

When CSI-RS resources included in a CSI-RS resource with repetition set to "on" are multiplexed in FDM with CSI-RS resources for CSI acquisition, for which repetition is not set, the Rx beam sweeping operation of the UE may be defined or restricted in consideration of an OCC to guarantee CSI acquisition performance. For example, when CSI-RS resources included in a CSI-RS resource with repetition set to "on" are multiplexed in FDM with CSI-RS resources for CSI acquisition, for which repetition is not set, the UE may not expect/assume to perform Rx beam sweeping or Rx beam refinement during N OFDM symbols (N=1, 2, 4, or 8) spanned by one CDM group. Further, the BS may indicate or configure this UE operation. For example, the BS may configure or indicate to the UE to change an Rx beam at a time when CDM4 group 1 is switched to CDM4 group 2, as illustrated in FIG. 26.

When CSI-RS resources included in a CSI-RS resource with repetition set to "off" are multiplexed in FDM with CSI-RS resources for CSI acquisition, for which repetition is not set, the UE does not expect that the BS will use different Tx filters during N OFDM symbols (N=1, 2, 4, or 8) spanned by one CDM group. That is, the UE does not expect that the BS will change a Tx filter in OFDM symbols corresponding to one CDM group. In other words, the UE does not expect that the BS will change a Tx beam in OFDM symbols corresponding to one CDM group.

Alternatively, only for FD-CDM2 as a configured CDM type or only for a CDM type spanning only one OFDM symbol like FD-CDM4, the UE may expect or assume that CSI-RS resources included in a CSI-RS resource set for which repetition is not set may be transmitted together with CSI-RS resources included in a CSI-RS resource set with repetition set to "on" or "off" in the same OFDM symbol. This UE operation may be configured or indicated by the BS.

Alternatively, when CSI-RS resources included in a CSI-RS resource with repetition set to "off" are transmitted together with CSI-RS resources for CSI acquisition and/or CSI-RS resources for time-frequency tracking in the same OFDM symbols, the UE does not expect or assume that the BS will use a different Tx filter in each of the same OFDM symbols. That is, the UE does not expect that the BS performs beam sweeping or beam refinement in each of the same OFDM symbols. This UE operation may be configured or indicated by the BS. This is because in the above case, when the BS performs OFDM symbol-wise beam sweeping and the UE receives a CSI-RS for CSI-acquisition accordingly, there may be a problem in CSI measurement, such as impairment of an OCC configured over two or four OFDM symbols.

Alternatively, when CSI-RS resources included in a CSI-RS resource set with repetition set to "on" are transmitted together with CSI-RS resources for CSI acquisition and/or CSI-RS resources for time-frequency tracking in the same OFDM symbols, the UE does not expect or assume to perform Rx beam sweeping or Rx beam refinement in the same OFDM symbols. Alternatively, the UE does not expect or assume to use a different Rx filter in each of the same OFDM symbols. This UE operation may be configured or indicated by the BS. This is because in the above case, when the UE performs OFDM symbol-wise Rx beam sweeping and receives a CSI for CSI-acquisition accordingly, there may be a problem in CSI measurement, such as impairment of an OCC configured over two or four OFDM symbols.

Embodiment 3

Due to relatively frequent PDCCH transmissions in a non-slot or mini-slot including 2/4/7 OFDM symbols, three or more types of RSs and channels such as the CSI-RS, the SS/PBCH block, and the PDCCH may be multiplexed and transmitted in the same OFDM symbol. A UE operation for this case will be described based on whether Rx beam sweeping is allowed based on RS characteristics described in Embodiment 2. In Embodiment 3, the UE may operate as follows, regarding multiplexing of the CSI-RS, the SS/PBCH block, and the PDCCH. This UE operation may be indicated or configured by the BS.

When the PDCCH is transmitted in an OFDM symbol in which the CSI-RS, particularly the CSI for BM and the SS/PBCH block are transmitted together, the UE may not expect or assume to perform Rx beam refinement or Rx beam sweeping. Further, the BS may configure or indicate to the UE not to perform Rx beam sweeping.

Alternatively, when Rx beam sweeping is important, the UE may not expect or assume that the PDCCH is transmitted in an OFDM symbol in which the CSI-RS for BM and the SS/PBCH block other than the SS/PBCH block for BFD are transmitted together. That is, it may be assumed that the PDCCH is multiplexed in TDM with the CSI-RS for BM and the SS/PBCH block other than the SS/PBCH block for BFD. This may be interpreted as giving priority to the simultaneous reception of the CSI-RS and the SS/PBCH block over the PDCCH reception and as giving priority to Rx beam sweeping over the PDCCH reception.

Alternatively, the UE may expect or assume that the PDCCH is transmitted in an OFDM symbol in which the SS/PBCH block for BFD is simultaneously transmitted with the CSI-RS for BFD, the CSI-RS for CSI acquisition, or the CSI-RS for time-frequency tracking, among SS/PBCH blocks and CSI-RSs serving various purposes. In this case, Rx beam sweeping in which the UE changes an Rx beam in each OFDM symbol may be restricted.

Alternatively, the UE may not expect or assume that CSI-RS resources included in a CSI-RS resource with repetition set to "off" are transmitted in an OFDM symbol in which the PDCCH and the SS/PBCH block are transmitted together. This may be interpreted as giving priority to the simultaneous reception of the SS/PBCH block and the PDCCH over the CSI-RS reception.

Alternatively, the UE may not expect or assume that the CSI-RS for BM is transmitted in an OFDM symbol in which the PDCCH and the SS/PBCH block for BFD are transmitted together. For example, the UE may expect or assume that only the CSI-RS for CSI acquisition and/or the CSI-RS for time-frequency tracking may be transmitted together in an OFDM symbol in which the PDCCH and the SS/PBCH block for BFD are transmitted together.

Alternatively, the UE may assume or expect that the PDCCH is not transmitted in an OFDM symbol in which one of the SS/PBCH block for BM, the SS/PBCH block for RRM, and the SS/PBCH block for RLM is transmitted together with CSI-RS resources included in a CSI-RS resource set with repetition set to "on" such as the CSI-RS for BM.

In other words, when the PDCCH, one of the SS/PBCH block for BM, the SS/PBCH block for RRM, and the SS/PBCH block for RLM, and CSI-RS resources included in a CSI-RS resource set with repetition set to "on" such as the CSI-RS for BM are configured to be transmitted in the same OFDM symbol, this may be interpreted as giving priority to the reception of the SS/PBCH block and the CSI-RS over the PDCCH reception. In other words, it may be interpreted as giving priority to the Rx beam sweeping of the UE.

Alternatively, when the SS/PBCH block for BFD, the CSI-RS for BM, and the PDCCH are configured to be transmitted in the same OFDM symbol, this may be interpreted as giving priority to the reception of the SS/PBCH block and the PDCCH over the reception of the CSI-RS for BM. For example, the BS may configure or indicate to the UE not to perform the Rx beam sweeping operation.

Alternatively, the UE may not expect or assume that the CSI-RS for BM is transmitted in an OFDM symbol in which the SS/PBCH block for BFD and the PDCCH are transmitted. This may be interpreted as giving/configuring/indicating priority to the reception of the SS/PBCH block for BFD and the PDCCH over the reception of the CSI-RS for BM or the Rx beam sweeping of the UE.

Alternatively, the UE may not expect that the CSI-RS, the SS/PBCH, and the PDCCH are transmitted in the same OFDM symbol, for any type of CSI such as the CSI-RS for CSI acquisition, the CSI-RS for BM, the CSI-RS for time-frequency tracking, the CSI-RS for RRM, and the CSI-RS for BFD, and for any type of SS/PBCH.

Alternatively, when the SS/PBCH block and the CSI-RS for BM are spatially QCLed, the UE may expect or assume that the SS/PBCH block and the CSI-RS are transmitted in the same OFDM symbol. When the PDCCH, the SS/PBCH block, and the CSI-RS are transmitted together, for example, due to configuration/definition/indication of a non-slot or a mini-slot in the same OFDM symbols in which the SS/PBCH block and the CSI-RS are transmitted, the UE may not expect/assume to perform Rx beam sweeping or Rx beam refinement in the same OFDM symbols. In other words, the UE may assume or expect to use the same Rx filter during the same OFDM symbols. The above-described UE operation may be indicated or configured by the BS. This UE operation may be important particularly in a non-slot. In the above case, the UE may assume/expect that the CSI-RS for BM and the PDCCH and/or the SS/PBCH block and the PDCCH are also spatially QCLed.

Alternatively, when the SS/PBCH block and the CSI-RS for BM are spatially QCLed, the UE may expect or assume that the SS/PBCH block and the CSI-RS will be transmitted in the same OFDM symbols. When the PDCCH, the SS/PBCH block, and the CSI-RS are all transmitted together due to configuration/definition/indication of the same OFDM symbols in which the SS/PBCH block and the CSI-RS are transmitted as a non-slot or a mini-slot, the UE may not expect or assume that the BS will use different Tx filters in the same OFDM symbols. For example, the UE may not expect/assume that the BS will change a Tx beam in the same OFDM symbols. This operation may be important particularly in a non-slot. In the above case, the UE may assume/expect that the CSI-RS for BM and the PDCCH and/or the SS/PBCH block and the PDCCH are also spatially QCLed.

Embodiment 3 may be applied and/or extended to the PDSCH instead of the PDCCH, in the same or similar manner.

Different RSs and channels may be transmitted in the same three or more OFDM symbols. For example, when a non-slot is configured, the PDCCH, the SS/PBCH block, and the CSI-RS may be transmitted in FDM. The BS may classify RSs (e.g., the CSI-RS such as the CSI-RS for CSI acquisition, the CSI-RS for BM, the CSI-RS for time-frequency tracking, and the CSI-RS for RRM, the DMRS, and the SS/PBCH block such as the SS/PBCH block for RRM, the SS/PBCH block for BM, and the SS/PBCH block for BFD) and/or channels based on simultaneously transmitted types and configurations into one or more RS groups according to the number of Rx beams that the UE is capable of simultaneously using, and configure QCL on an RS group basis.

For this operation, the BS may indicate or configure the priority of a specific RS group to or for the UE. Particularly, when the number of configured/indicated RS groups is less than the number of beams that the UE is capable of receiving, the BS may indicate/configure the priority of a specific group to the UE based on this. The RS groups may be transmitted in the same CC or BWP or in different CCs or BWPs. For example, when the CSI-RS, SS/PBCH block #1, and the PDCCH are transmitted in the same OFDM symbols, the CSI-RS and SS/PBCH block #1 may be spatially QCLed, and the spatial QCL reference for the PDCCH may be configured as another SS/PBCH block such as SS/PBCH #0.

Embodiment 4

(1) When an aperiodic CSI-RS is configured, the UE may be configured with 14 or more CSI-RS resources in a single CSI-RS resource set. Because the CSI-RS resources of a CSI-RS resource set with CSI-RS-ResourceRep set to "on" (e.g., the higher-layer parameter repetition set to "on") are multiplexed in TDM, specific 14 or more CSI-RS resources may not be defined/configured in one slot including 14 OFDM symbols. Therefore, although an offset needs to be set for each CSI-RS resource, it is regulated for the current periodic CSI-RS that a slot offset should be set for each resource set. In this context, the following embodiments of the present disclosure are proposed.

When a slot offset is set for CSI-RS resources for which the time-domain behavior of a configured CSI-RS is "aperiodic", a higher-layer parameter "CSI-ResourcePeriodicityAndOffset" that sets the periodicity and slot offset of a periodic CSI-RS may be used. For example, the slot offset of the aperiodic CSI-RS resources may be set only using the slot offset set in "CSI-ResourcePeriodicityAndOffset", ignoring the periodicity set in "CSI-ResourcePeriodicityAndOffset". The higher-layer parameter "CSI-ResourcePeriodicityAndOffset" is described in 3GPP TS 38.331.

Alternatively, in the case where the time-domain behavior is "aperiodic", the slot offset may be '0' when the slot offset of the CSI-RS resources is not set, whereas the BS may set 1 as a default slot offset "1", when the slot offset is set. Further, when the slot offset of the aperiodic CSI-RS resources is set, the slot offset may be fixed to the default slot offset '1'.

Alternatively, in the case where repetition is set to "on" for an aperiodic CSI-RS resource set, when the time-domain behavior is aperiodic, the UE may not expect/assume that there are 14 or more CSI-RS resources in the configured CSI-RS resource set. If 14 or more CSI-RS resources are configured, the UE may consider only 14 CSI-RS resources with the smallest CSI-RS resource IDs, ignoring the remaining CSI-RS resources. When repetition is set to "on" for the aperiodic CSI-RS resource set, the maximum number of CSI-RS resources that BS may configure in one CSI-RS resource set may be limited to 14.

Alternatively, in the case where repetition is set to "on" for an aperiodic CSI-RS resource set, when the time-domain behavior is aperiodic and there are 14 or more CSI-RS resources, the UE may assume that the remaining CSI-RS resources (e.g., CSI-RS resource #15/#16) except for 14 CSI-RS resources with the smallest CSI-RS resource IDs are transmitted in the slot following a slot carrying the 14 CSI-RS resources with the smallest CSI-RS resource IDs, that is, a slot adjacent to the slot carrying the 14 CSI-RS resources with the smallest CSI-RS resource IDs. Alternatively, although a slot offset is or is not set to 0 for the 14 CSI-RS resources with the smallest CSI-RS resource IDs, the UE may automatically perceive/assume that the slot offset is set to 1 for the remaining CSI-RS resources. For example, the UE may be aware that the slot offset of the remaining CSI-RS resources except for the 14 CSI-RS resources with the smallest CSI-RS resource IDs is the default value, "1".

The UE may not expect/assume that 14 or more CSI-RS resources are included in the configured CSI-RS resource set. If 14 or more CSI-RS resources are configured, the UE may consider only 14 CSI-RS resources with the smallest CSI-RS resource IDs, ignoring the other CSI-RS resources.

(2) In the case where a CSI-RS resource set is configured, when the time-domain behavior of a CSI-RS is "aperiodic" and the higher-layer parameter TRS-Info is set, that is, a CSI-RS resource set for time-frequency tracking is configured, a total of four CSI-RS resources may be configured for the UE.

When the CSI-RS resource set with the higher-layer parameter "TRS-Info" set includes four CSI-RS resources, the UE may perceive/assume/expect that two CSI-RS resources with the smallest CSI-RS resource IDs and two CSI-RS resources with the largest CSI-RS resource IDs are transmitted in two different adjacent slots.

The slot offset of the two CSI-RS resources with the largest CSI-RS resource IDs may be set to the default value "1" or the UE may automatically perceive/assume that the slot offset is 1.

Alternatively, when a slot offset is set for CSI-RS resources for which the time-domain behavior of a CSI-RS is "aperiodic", the higher-layer parameter "CSI-ResourcePeriodicityAndOffset" that sets the periodicity and slot offset of a periodic CSI-RS may be used. For example, the slot offset of the aperiodic CSI-RS resources may be set, only using the slot offset set in "CSI-ResourcePeriodicityAndOffset", while the periodicity set in "CSI-ResourcePeriodicityAndOffset" is ignored. The higher-layer parameter "CSI-ResourcePeriodicityAndOffset" is described in 3GPP TS 38.331.

Alternatively, only for a CSI-RS resource set with the higher-layer parameter "TRS-Info" set, the UE may expect/assume that up to two or more CSI-RS resource sets may be simultaneously triggered. In other words, only two or more CSI-RS resource sets for time-frequency tracking may be triggered at the same time. When two CSI-RS resource sets with the higher-layer parameter "TRS-Info" set are triggered at the same time, the UE may assume/expect that all of CSI-RS resources included in the two CSI-RS resource sets use the same antenna port.

Figure 27:
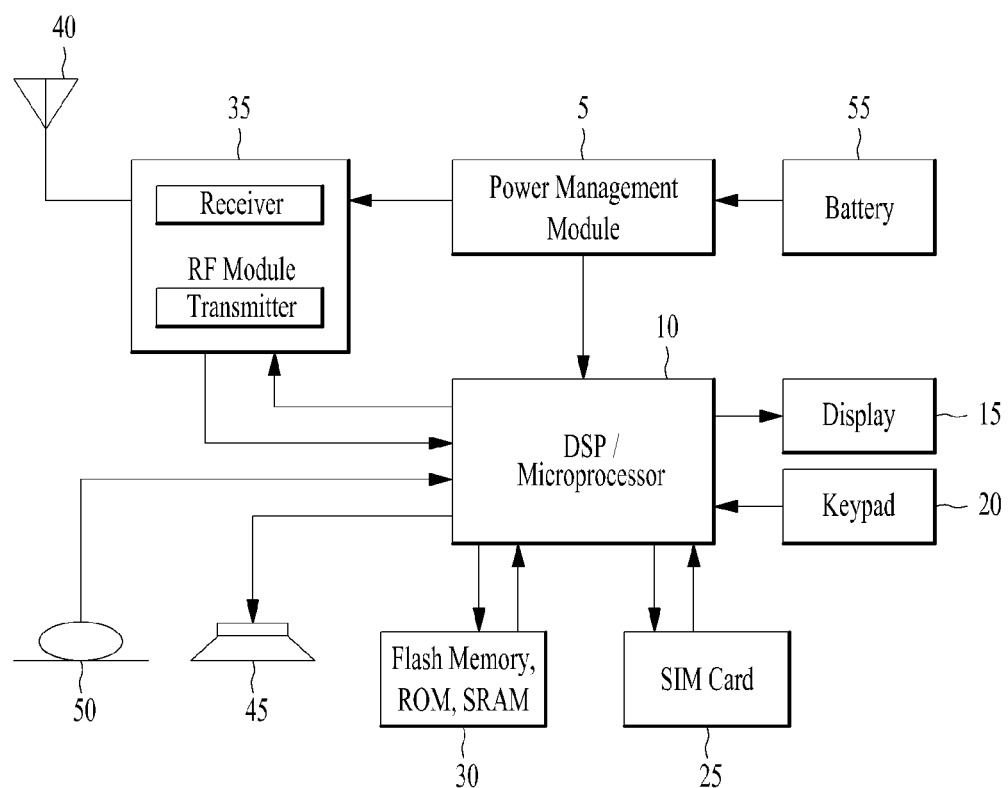
FIG. 27 is a block diagram illustrating components of a wireless device for implementing the present disclosure.

FIG. 27 illustrates an example of a wireless communication device according to an embodiment of the present disclosure.

The wireless communication device illustrated in FIG. 27 may represent a UE and/or a BS according to an embodiment of the present disclosure. However, the wireless communication device of FIG. 27 may be replaced with any of various types of devices such as a vehicle communication system or device, a wearable device, and a laptop, not limited to the UE and/or the BS according to the embodiment of the present disclosure.

In the example of FIG. 27, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 26. In at least some of the embodiments described with reference to FIGS. 1 to 26, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 27 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Specifically, to implement the embodiments of the present disclosure, a UE operation when the wireless communication device illustrated in FIG. 27 is a UE according to an embodiment of the present disclosure will be described. When the wireless communication device is a UE according to an embodiment of the present disclosure, the processor 10 may include settings such as QCL, repetition "on/off", ReportQuantity, and/or TRS-info. Specifically, what setting the processor 10 receives may be based on the above-described embodiments.

The processor 10 may control the transceiver 35 to receive two or more DL signals of different types or different configurations among DL signals such as an SS/PBCH block, a CSI-RS, a CSI-IM, a PDCCH, and a PDSCH based on the received configuration. For example, the two or more DL signals may be received in FDM in the same time area. Further, the two or more DL signals may be received in different CCs. The types and/or configurations, transmission formats, and reception schemes of the two or more downlink signals, a transmission type of the two or more DL signals may be based on the above-described embodiments.

To implement the embodiments of the present disclosure, when the wireless communication device illustrated in FIG. 27 is a BS according to an embodiment of the present disclosure, the processor 10 may control the transceiver 35 to transmit an Rx beam-related configuration to a UE. The Rx beam-related configuration may include settings such as QCL, repetition "on/off", ReportQuantity, and/or TRS-info. Specifically, what setting the processor 10 transmits may be based on the above-described embodiments.

The processor 10 may control the transceiver 35 to transmit two or more DL signals of different types or different configurations among DL signals such as an SS/PBCH block, a CSI-RS, a CSI-IM, a PDCCH, and a PDSCH based on the transmitted configuration. The processor 10 may control the transceiver 35 to transmit the two or more DL signals in FDM in the same time area. Further, the processor 10 may control the transceiver 35 to transmit the two or more DL signals in different CCs. The types and/or configurations, transmission formats, and/or transmission schemes of the two or more DL signals, a transmission type of the two or more DL signals may be based on the above-described embodiments.

The embodiments described above are those in which the elements and features of the present disclosure are combined in a predetermined form. Each component or feature shall be considered optional unless otherwise expressly stated. Each component or feature may be implemented in a form that is not combined with other components or features. It is also possible to construct embodiments of the present disclosure by combining some of the elements and/or features. The order of the operations described in the embodiments of the present disclosure may be changed. Some configurations or features of certain implementations may be included in other embodiments, or may be replaced with corresponding configurations or features of other embodiments. It is clear that the claims that are not expressly cited in the claims may be combined to form an embodiment or be included in a new claim by an amendment after the application.

The specific operation described herein as being performed by the BS may be performed by its upper node, in some cases. That is, it is apparent that various operations performed for communication with a UE in a network including a plurality of network nodes including a BS may be performed by the BS or by a network node other than the BS. ABS may be replaced by terms such as a fixed station, a Node B, an eNode B (eNB), an access point, and the like.

Embodiments of the present disclosure may be implemented by various means, for example, hardware, firmware, software or a combination thereof. In the case of hardware implementation, an embodiment of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In a firmware or software configuration, an embodiment of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

INDUSTRIAL APPLICABILITY

While the method and apparatus for transmitting and receiving a DL signal have been described above in the context of being applied to a 5G NewRAT system, they are also applicable to various wireless communication system as well as the 5G NewRAT system.

The invention claimed is:

1. A method of receiving a downlink signal by a user equipment (UE) configured for Carrier Aggregation (CA) in a wireless communication system, the method comprising:
   receiving, through a first component carrier, a Physical Downlink Control Channel (PDCCH); and
   receiving, through a second component carrier different from the first component carrier, a Physical Downlink Shared Channel (PDSCH),
   wherein, based on (i) a first Reception (Rx) parameter for the PDCCH being different from a second Rx parameter for the PDSCH and (ii) the PDCCH and the PDSCH being at least partially overlapped in a time domain, the PDCCH is received in a time resource overlapped between the PDCCH and the PDSCH based on a priority of a reception of the PDCCH being higher than a priority of a reception of the PDSCH.

2. The method according to claim 1, wherein the PDCCH and PDSCH are received based on the first Rx parameter.

3. The method according to claim 1, wherein the first Rx parameter and the second Rx parameter are received through RRC signaling.

4. The method according to claim 1, wherein the CA is intra-band CA.

5. The method according to claim 1, wherein the first component carrier is a primary component carrier.

6. The method according to claim 1, wherein the UE is communicable with at least one of a UE other than the UE, a network, a base station (BS), or an autonomous driving vehicle.

7. An apparatus configured for Carrier Aggregation (CA) for receiving a downlink signal in a wireless communication system, the apparatus comprising:
at least one processor; and
at least one computer memory operably connectable to the at least one processor and storing instructions that, when executed, cause the at least one processor to perform operations comprising:
receiving, through a first component carrier, a Physical Downlink Control Channel (PDCCH); and
receiving, through a second component carrier different from the first component carrier, a Physical Downlink Shared Channel (PDSCH), and
wherein, based on (i) a first Reception (Rx) parameter for the PDCCH being different from a second Rx parameter for the PDSCH and (ii) the PDCCH and the PDSCH being at least partially overlapped in a time domain, the PDCCH is received in a time resource overlapped between the PDCCH and the PDSCH based on a priority of a reception of the PDCCH being higher than a priority of a reception of the PDSCH.

8. The apparatus according to claim 7, wherein the PDCCH and PDSCH are received based on the first Rx parameter.

9. The apparatus according to claim 7, wherein the first Rx parameter and the second Rx parameter are received through RRC signaling.

10. The apparatus according to claim 7, wherein the CA is intra-band CA.

11. The apparatus according to claim 7, wherein the first component carrier is a primary component carrier.

12. The apparatus according to claim 7, wherein the apparatus is communicable with at least one of a user equipment (UE), a network, a base station (BS), or an autonomous driving vehicle other than the apparatus.

13. A user equipment (UE) configured for Carrier Aggregation (CA) for receiving a downlink signal in a wireless communication system, the UE comprising:
at least one transceiver;
at least one processor; and
at least one computer memory operably connectable to the at least one processor and storing instructions that, when executed, cause the at least one processor to perform operations comprising:
receiving, through a first component carrier, a Physical Downlink Control Channel (PDCCH) through the at least one transceiver; and
receiving, through a second component carrier different from the first component carrier, a Physical Downlink Shared Channel (PDSCH) through the at least one transceiver, and
wherein, based on (i) a first Reception (Rx) parameter for the PDCCH being different from a second Rx parameter for the PDSCH and (ii) the PDCCH and the PDSCH being at least partially overlapped in a time domain, the PDCCH is received in a time resource overlapped between the PDCCH and the PDSCH based on a priority of a reception of the PDCCH being higher than a priority of a reception of the PDSCH.

14. A non-transitory medium comprising instructions which are readable by a processor and are configured to cause the processor to perform operations, the operations comprising:
receiving, through a first component carrier, a Physical Downlink Control Channel (PDCCH); and
receiving, through a second component carrier different from the first component carrier, a Physical Downlink Shared Channel (PDSCH),
wherein, based on (i) a first Reception (Rx) parameter for the PDCCH being different from a second Rx parameter for the PDSCH and (ii) the PDCCH and the PDSCH being at least partially overlapped in a time domain, the PDCCH is received in a time resource overlapped between the PDCCH and the PDSCH based on a priority of a reception of the PDCCH being higher than a priority of a reception of the PDSCH.

* * * * *